(12) United States Patent
Fees et al.

(10) Patent No.: US 11,772,178 B2
(45) Date of Patent: Oct. 3, 2023

(54) MULTI-LAYER CONTACT PLATE AND METHOD THEREOF

(71) Applicant: American Battery Solutions, Inc., Lake Orion, MI (US)

(72) Inventors: Heiner Fees, Bietigheim-Bissingen (DE); Andreas Track, Sachsenheim (DE); Ralf Maisch, Abstatt (DE); Alexander Eichhorn, Eppingen (DE); Jörg Damaske, Freiberg (DE); Valentin Brokop, Walheim (DE); Hans-Joachim Pflüger, Wüstenrot (DE); Claus Gerald Pflüger, Markgröningen (DE)

(73) Assignee: AMERICAN BATTERY SOLUTIONS, INC., Dover, DE (US)

( * ) Notice: Subject to any disclaimer, the term of this patent is extended or adjusted under 35 U.S.C. 154(b) by 486 days.

(21) Appl. No.: 16/737,358

(22) Filed: Jan. 8, 2020

(65) Prior Publication Data

US 2020/0220145 A1 Jul. 9, 2020

Related U.S. Application Data

(60) Provisional application No. 62/789,659, filed on Jan. 8, 2019.

(51) Int. Cl.
*H01M 4/02* (2006.01)
*B23K 1/00* (2006.01)
(Continued)

(52) U.S. Cl.
CPC ......... *B23K 1/0016* (2013.01); *H01M 50/503* (2021.01); *H01M 50/522* (2021.01);
(Continued)

(58) Field of Classification Search
CPC ...................................................... H01M 4/02
See application file for complete search history.

(56) References Cited

U.S. PATENT DOCUMENTS

2004/0009334 A1* 1/2004 Miyamoto .......... H01M 50/531
428/209
2009/0072381 A1 3/2009 Ishihara et al.
(Continued)

FOREIGN PATENT DOCUMENTS

CN 105932214 A 9/2016

OTHER PUBLICATIONS

Office Action for corresponding Chinese Application 202080005622. 7, dated Jan. 5, 2023.
(Continued)

*Primary Examiner* — Jacob B Marks
(74) *Attorney, Agent, or Firm* — FINNEGAN, HENDERSON, FARABOW, GARRETT & DUNNER, LLP

(57) ABSTRACT

An embodiment of the disclosure is directed to a multi-layer contact plate configured to establish electrical bonds to battery cells in a battery module, comprising a first plate section configured with a first set of raised dimples on an inner side of the first plate section, a second plate section configured with a second set of raised dimples on an inner side of the second plate section, a cell terminal connection layer sandwiched between the first and second plate sections, wherein a portion of the cell terminal connection layer is configured to form a set of bonding connectors to provide a direct electrical bond between the multi-layer contact plate and terminals of at least one group of battery cells, and a set of inter-layer connection points arranged between at least the first and second plate sections, each of the set of inter-layer connection points being arranged where raised
(Continued)

dimples on the first and second plate sections are aligned with each other.

12 Claims, 38 Drawing Sheets

(51) Int. Cl.
    *H01M 50/528* (2021.01)
    *H01M 50/559* (2021.01)
    *H01M 50/548* (2021.01)
    *H01M 50/526* (2021.01)
    *H01M 50/522* (2021.01)
    *H01M 50/503* (2021.01)
    *B23K 101/36* (2006.01)
    *B23K 1/008* (2006.01)

(52) U.S. Cl.
    CPC ....... *H01M 50/526* (2021.01); *H01M 50/528* (2021.01); *H01M 50/548* (2021.01); *H01M 50/559* (2021.01); *B23K 1/008* (2013.01); *B23K 2101/36* (2018.08); *H01M 2220/20* (2013.01)

(56) References Cited

U.S. PATENT DOCUMENTS

| | | |
|---|---|---|
| 2010/0263462 A1 | 10/2010 | Nakamura |
| 2012/0288740 A1* | 11/2012 | Byun ................. H01M 50/291 429/96 |
| 2018/0108886 A1 | 4/2018 | Fees et al. |

OTHER PUBLICATIONS

International Search Report dated Mar. 5, 2020, in corresponding International Application PCT/US2020/012705.
International Preliminary Report on Patentability dated Jun. 16, 2021, in corresponding PCT Application No. PCT/US2020/012705.

* cited by examiner

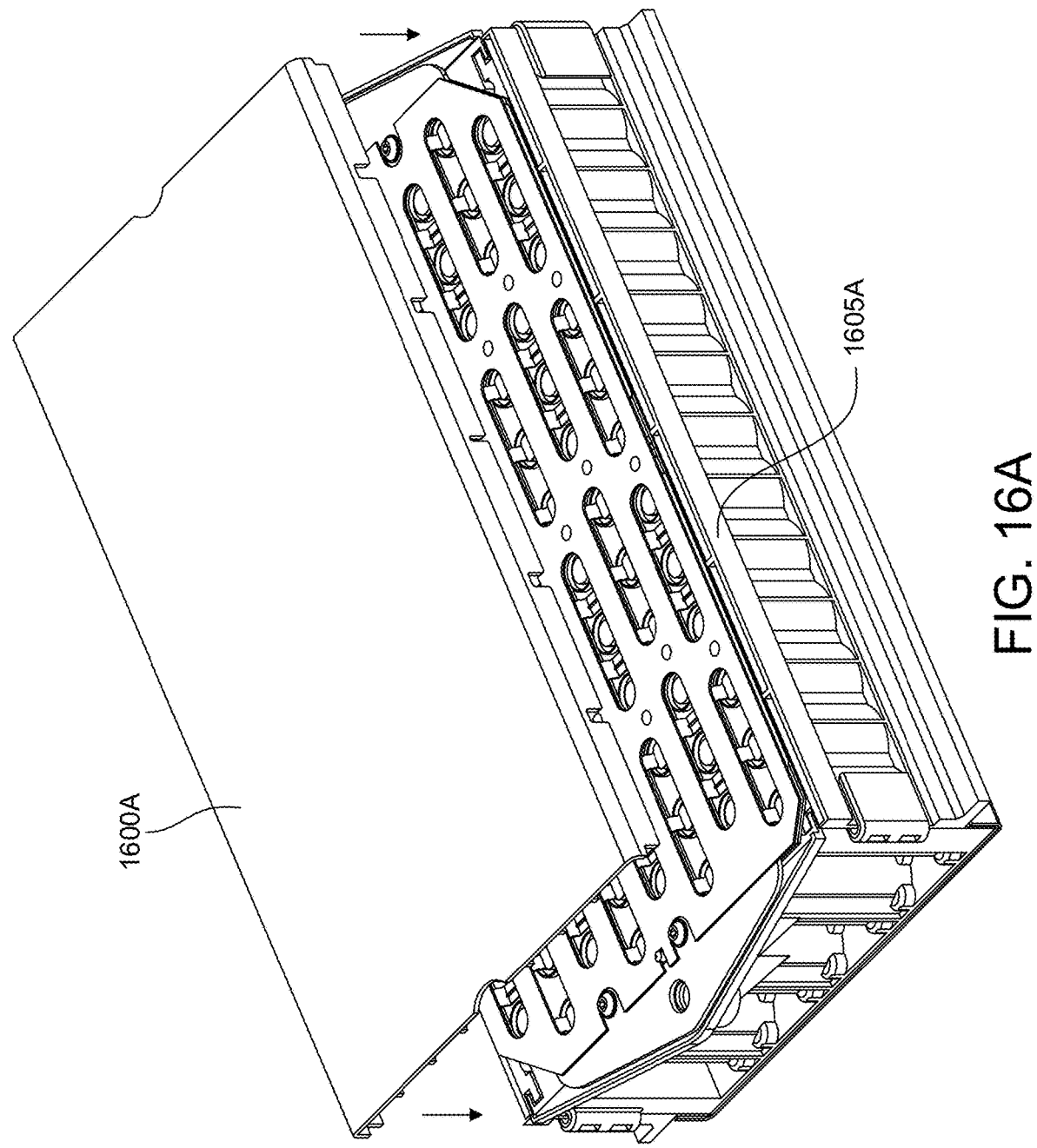

MULTI-LAYER CONTACT PLATE AND METHOD THEREOF

CROSS-REFERENCE TO RELATED APPLICATIONS

The present Application for Patent claims the benefit of U.S. Provisional Application No. 62/789,659, entitled "MULTI-LAYER CONTACT PLATE AND METHOD THEREOF", filed Jan. 8, 2019, which is assigned to the assignee hereof and hereby expressly incorporated by reference herein in its entirety.

BACKGROUND

1. Field of the Disclosure

Embodiments relate to a multi-layer contact plate and method thereof.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are electrical connected (series and/or parallel) to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment of the disclosure is directed to a multi-layer contact plate configured to establish electrical bonds to battery cells in a battery module, comprising a first plate section configured with a first set of raised dimples on an inner side of the first plate section, a second plate section configured with a second set of raised dimples on an inner side of the second plate section, a cell terminal connection layer sandwiched between the first and second plate sections, wherein a portion of the cell terminal connection layer is configured to form a set of bonding connectors to provide a direct electrical bond between the multi-layer contact plate and terminals of at least one group of battery cells, and a set of inter-layer connection points arranged between at least the first and second plate sections, each of the set of inter-layer connection points being arranged where raised dimples on the first and second plate sections are aligned with each other.

Another embodiment of the disclosure is directed to a method of forming a multi-layer contact plate, comprising applying a soldering or brazing material to a first set of points of a first plate section, a second set of points of a second plate section, and/or to parts of a cell terminal connection layer that are aligned with the first and second sets of points upon stacking of the first and second plate sections with the cell terminal connection layer, stacking the first and second plate sections with the cell terminal connection layer to produce a stacked structure, and passing the stacked structure through a furnace to produce the multi-layer contact plate having a set of inter-layer connection points where the first and second plate sections are joined in part by the soldering or brazing material, each inter-layer connection point of the set of inter-layer connection points comprising a respective raised dimple on an inner surface of at least one of the first and second plate sections.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIGS. 4-16B illustrate a battery module assembly procedure in accordance with an embodiment of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are electrical connected (series or parallel) to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Embodiments of the disclosure relate to various configurations of battery modules that may be deployed as part of an energy storage system. In an example, while not illustrated expressly, multiple battery modules in accordance with any of the embodiments described herein may be deployed with respect to an energy storage system (e.g., chained in series to provide higher voltage to the energy storage system, connected in parallel to provide higher current to the energy storage system, or a combination thereof).

Figure 1A:
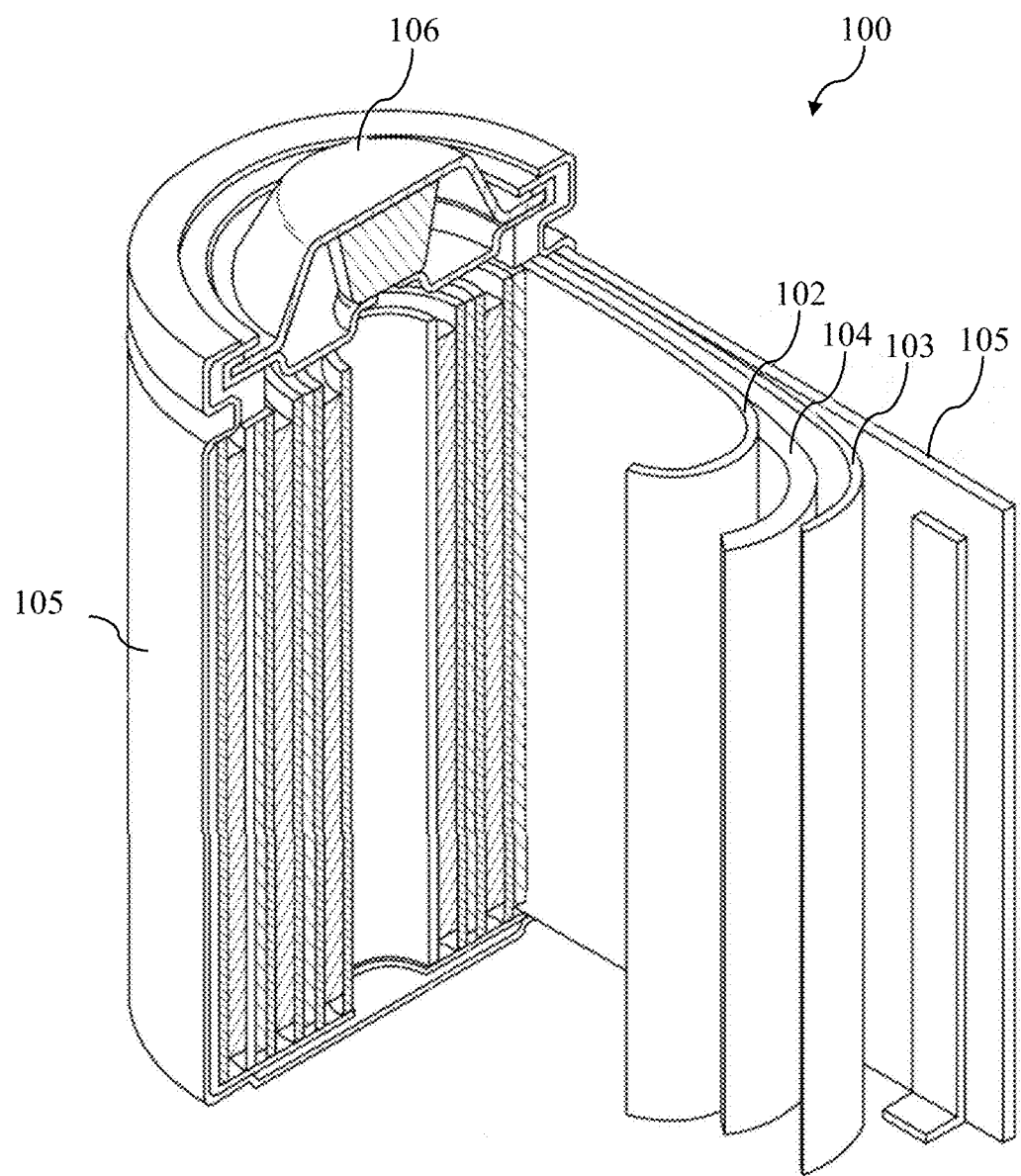
FIG. 1A illustrates an example metal-ion (e.g., Li-ion) battery in which the components, materials, methods, and other techniques described herein, or combinations thereof, may be applied according to various embodiments.

FIG. 1A illustrates an example metal-ion (e.g., Li-ion) battery in which the components, materials, methods, and other techniques described herein, or combinations thereof, may be applied according to various embodiments. A cylindrical battery cell is shown here for illustration purposes. The example battery 100A includes a negative anode 102A, a positive cathode 103A, a separator 104A interposed between the anode 102A and the cathode 103A, an electrolyte (shown implicitly) impregnating the separator 104A, a battery case 105A, and a sealing member 106A sealing the battery case 105A.

Figure 1B:
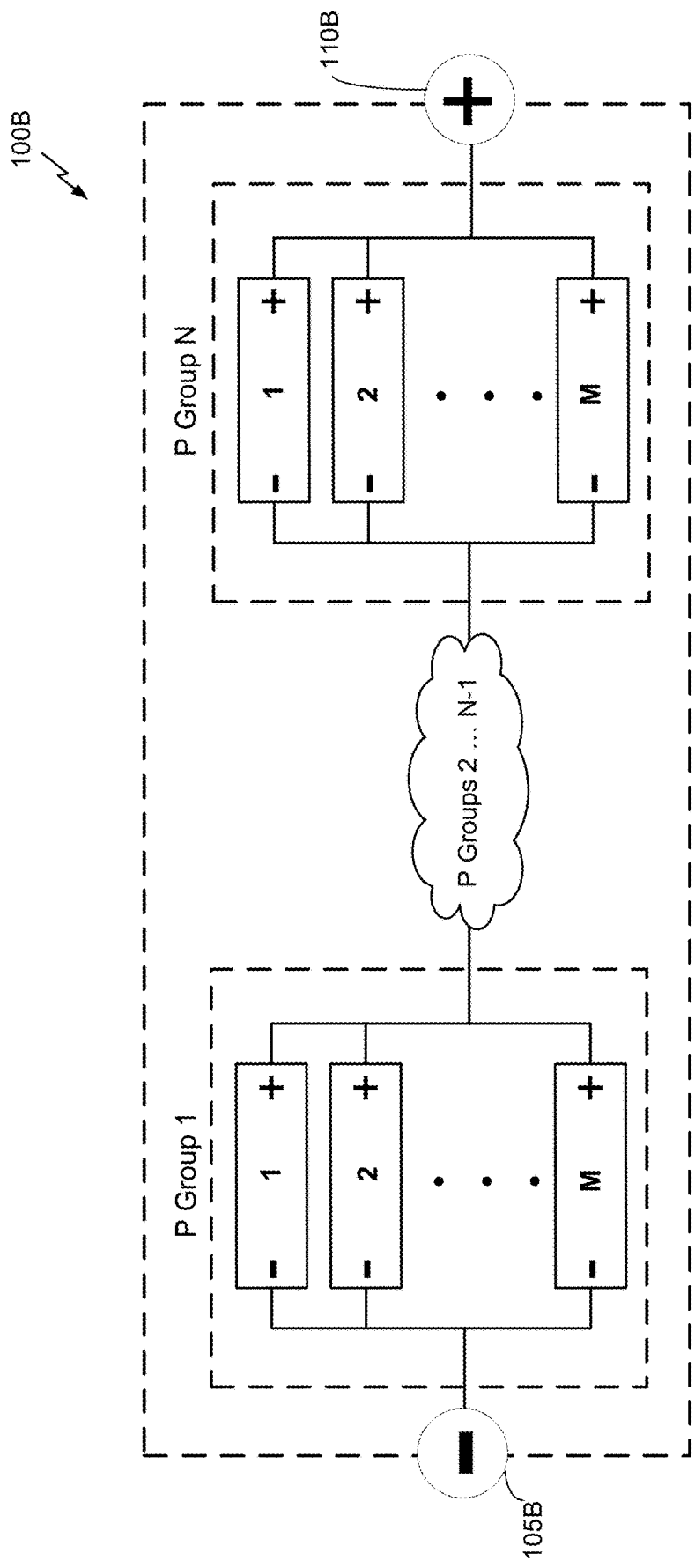
FIG. 1B illustrates a high-level electrical diagram of an exemplary battery module that shows P groups 1 . . . N connected in series in accordance with an embodiment of the disclosure.

FIG. 1B illustrates a high-level electrical diagram of a battery module 100 that shows P groups 1 . . . N connected in series in accordance with an embodiment of the disclosure. In an example, N may be an integer greater than or equal to 2 (e.g., if N=2, then the intervening P groups denoted as P groups 2 . . . N−1 in FIG. 1 may be omitted). Each P group includes battery cells 1 . . . M connected in parallel. The negative terminal of the first series-connected P group (or P group 1) is coupled to a negative terminal 105 of the battery module 100B, while the positive terminal of the last series-connected P group (or P group N) is connected to a positive terminal 110B of the battery module 100B. As used herein, battery modules may be characterized by the number of P groups connected in series included therein. In particular, a battery module with 2 series-connected P groups is referred to as a "2S" system, a battery module with 3 series-connected P groups is referred to as a "3S" system, and so on.

Figure 2:
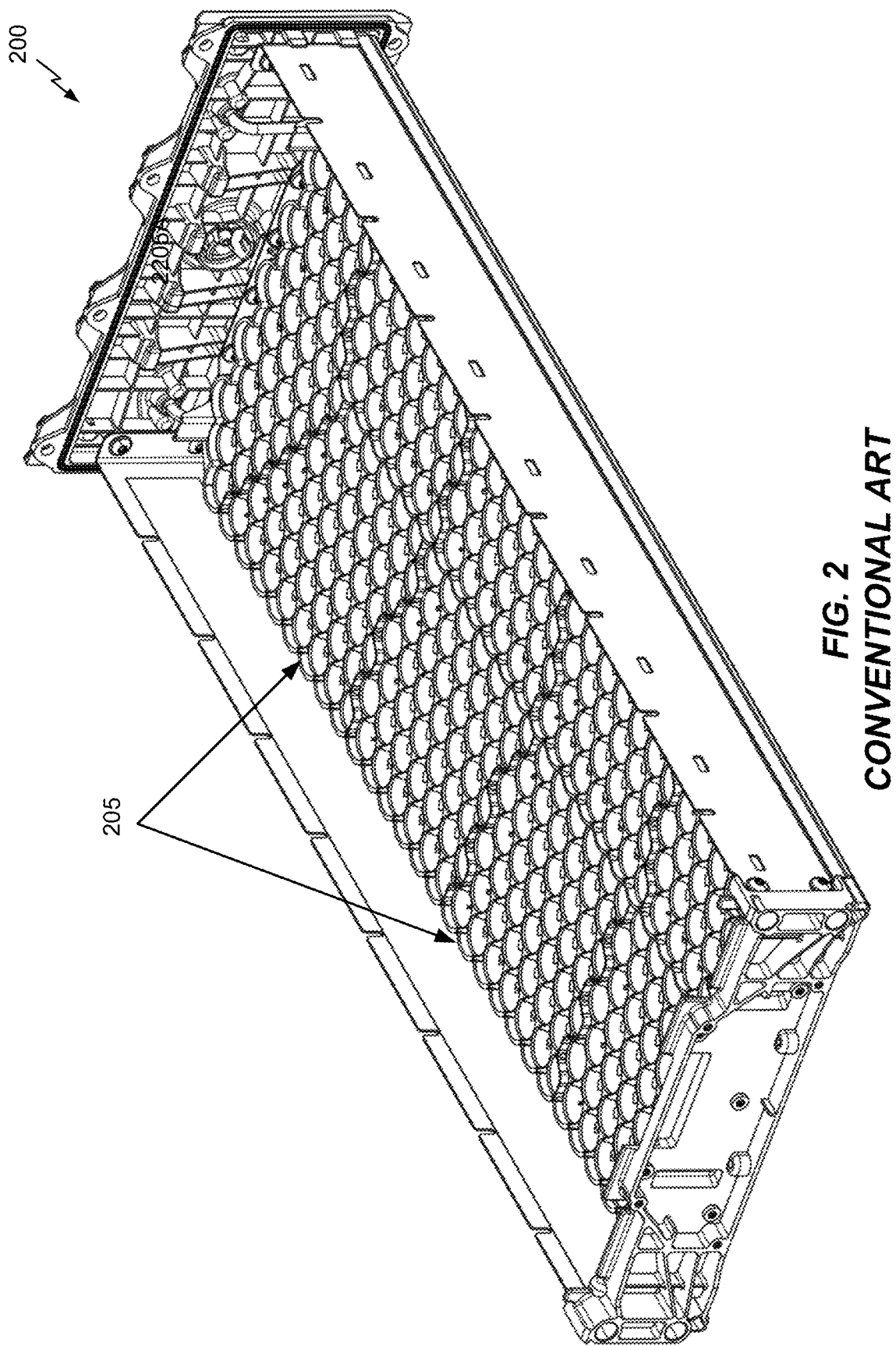
FIG. 2 illustrates a battery module during assembly.

FIG. 2 illustrates a battery module 200 during assembly. In FIG. 2, a bottom cell fixation element 205 containing a plurality of battery cell receptacles for fixing a bottom part of cylindrical battery cells is shown. The bottom cell fixation element 205 may be arranged as a single large piece of plastic (or several joined pieces of plastic) that is inserted and secured (e.g., glued) to a bottom of the battery module 200. The bottom cell fixation element 205 may be arranged such that different contiguous clusters of receptacles correspond to different P Groups.

Figure 3:
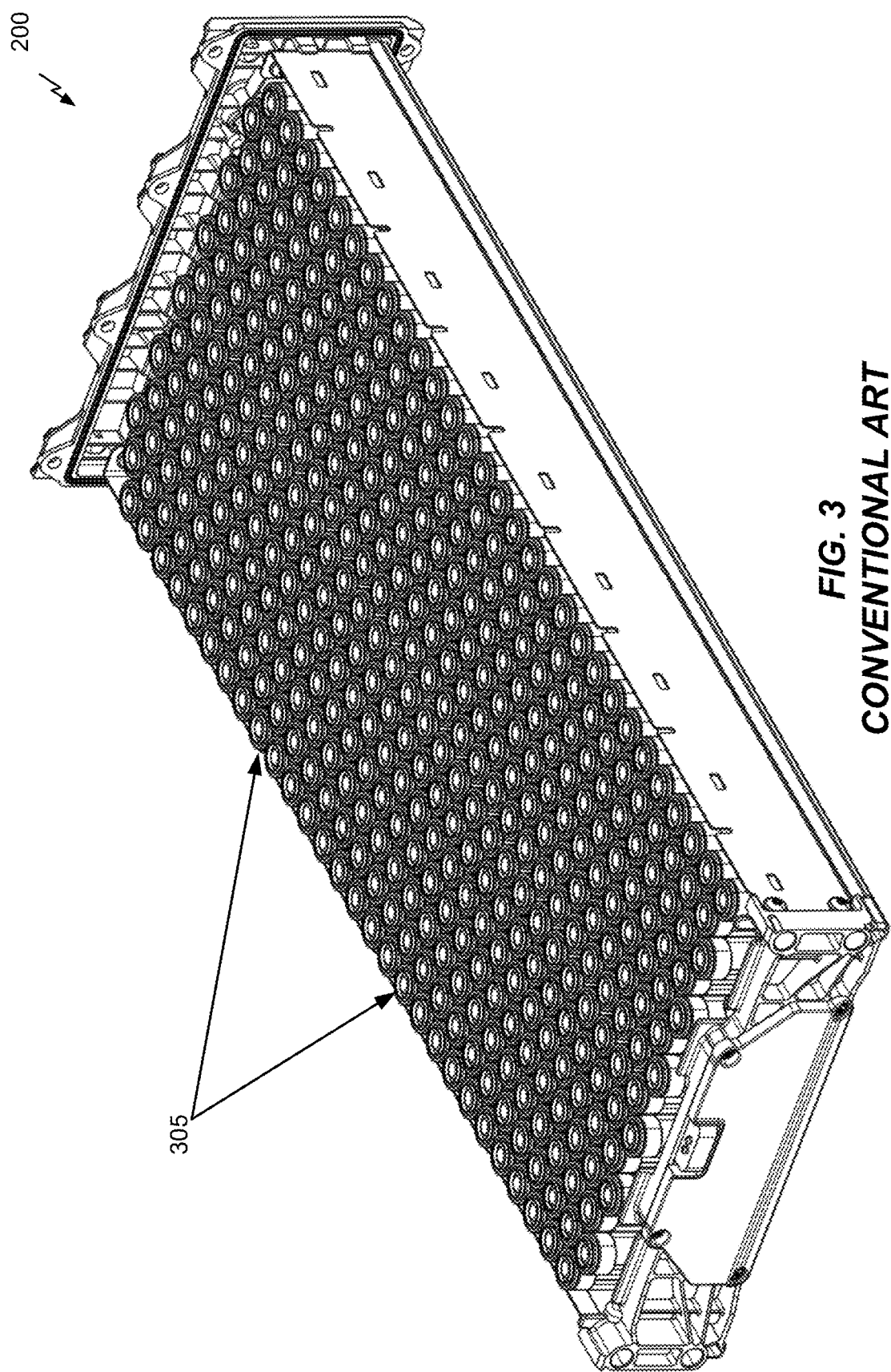
FIG. 3 illustrates the battery module of FIG. 2 during a later point of assembly after battery cells are inserted into respective receptacles of a bottom cell fixation element.

FIG. 3 illustrates the battery module 200 during a later point of assembly after battery cells 305 are inserted into the respective receptacles of the bottom cell fixation element 205. While not shown, a top cell fixation element (not shown) may be arranged over the battery cells 305, such that the battery cells 305 are substantially fixed (or secured) inside the battery module 200 via their attachment to the top cell fixation element 205 (not shown) and the bottom cell fixation element 205.

One drawback to the cell fixation arrangement depicted in FIGS. 2-3 is limited tolerance to crash forces. For example, assume that the battery module 200 is deployed in an electric vehicle that experiences crash forces. The individual battery cells 305 are securely held via the top cell fixation element 205 (not shown) and the bottom cell fixation element 205, which can cause stress and possible rupture to the battery cells 305 depending on the strength of the crash forces.

FIGS. 4-16B illustrate a battery module assembly procedure in accordance with an embodiment of the disclosure.

Figure 4:
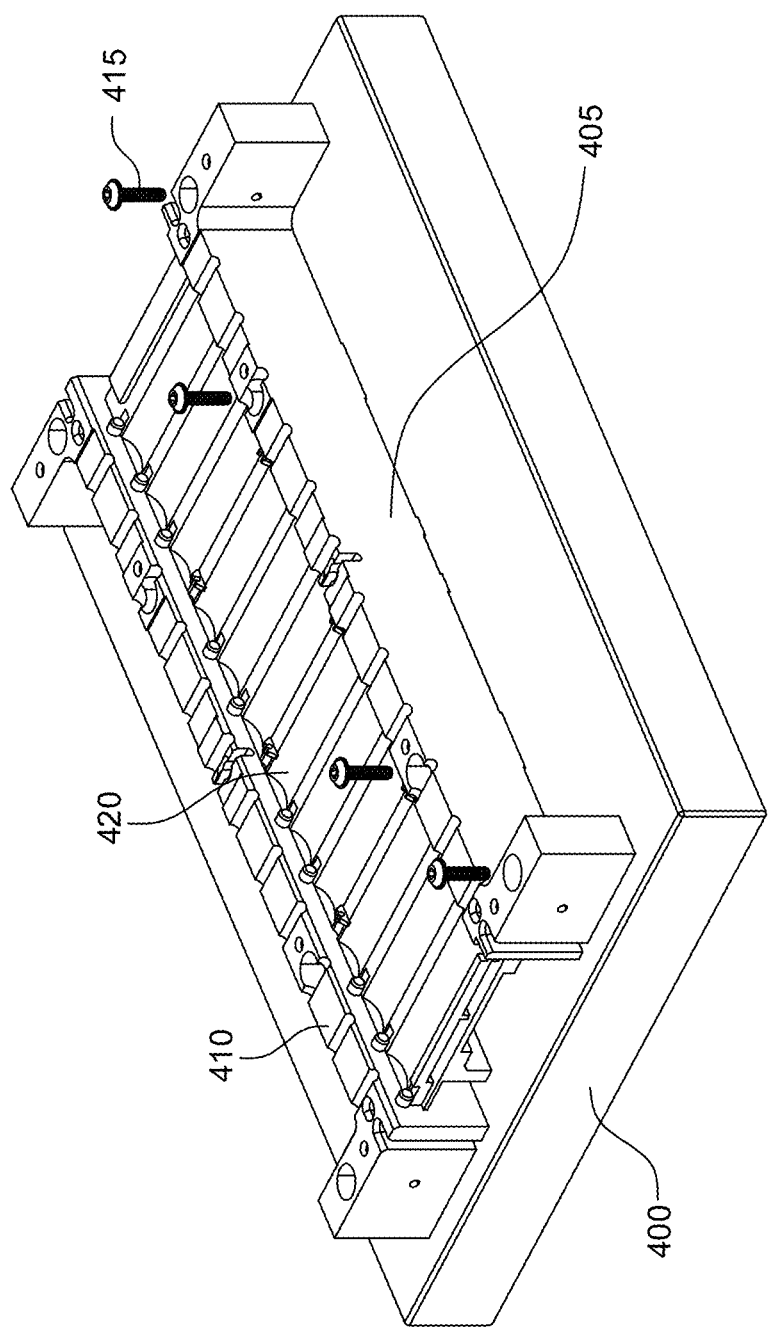

Referring to FIG. 4, the battery module begins construction on a base plate onto which jigs (plus side and minus side) are mounted (e.g., via screws). The jigs are stackable, as will be discussed below in more detail. An external frame component of the battery module is arranged between the jigs. As used herein, the "minus side" of the battery cell refers to the side of the battery cell that opposes the positive terminal of the battery cell. For certain implementations, battery cells with positive and negative terminals arranged on the same side may be used (e.g., a positive cell head surrounded by a negative cell rim), in which case the "minus side" does not necessarily correspond to the negative terminal of a respective battery cell.

Figure 5:
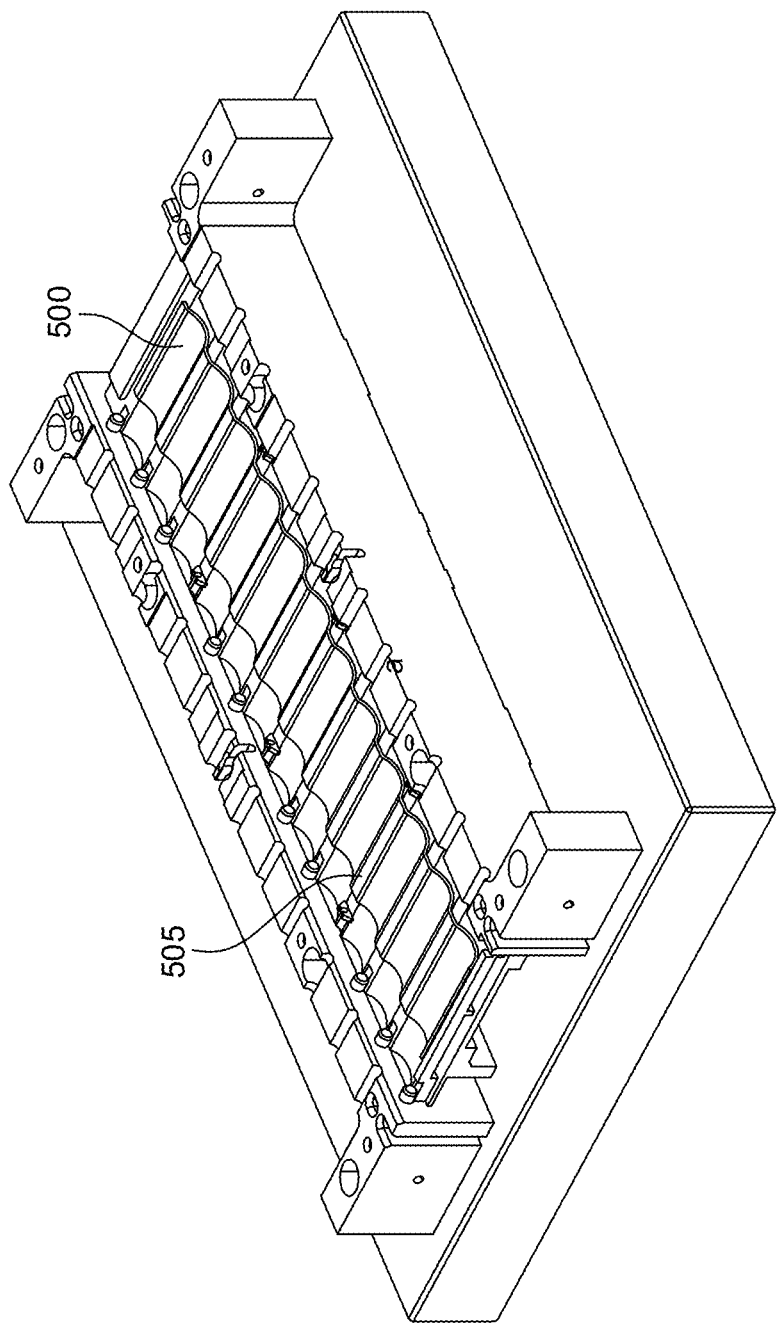

Referring to FIG. 5, an insulative layer is glued onto the external frame component via a dispensing machine.

Figure 6A:
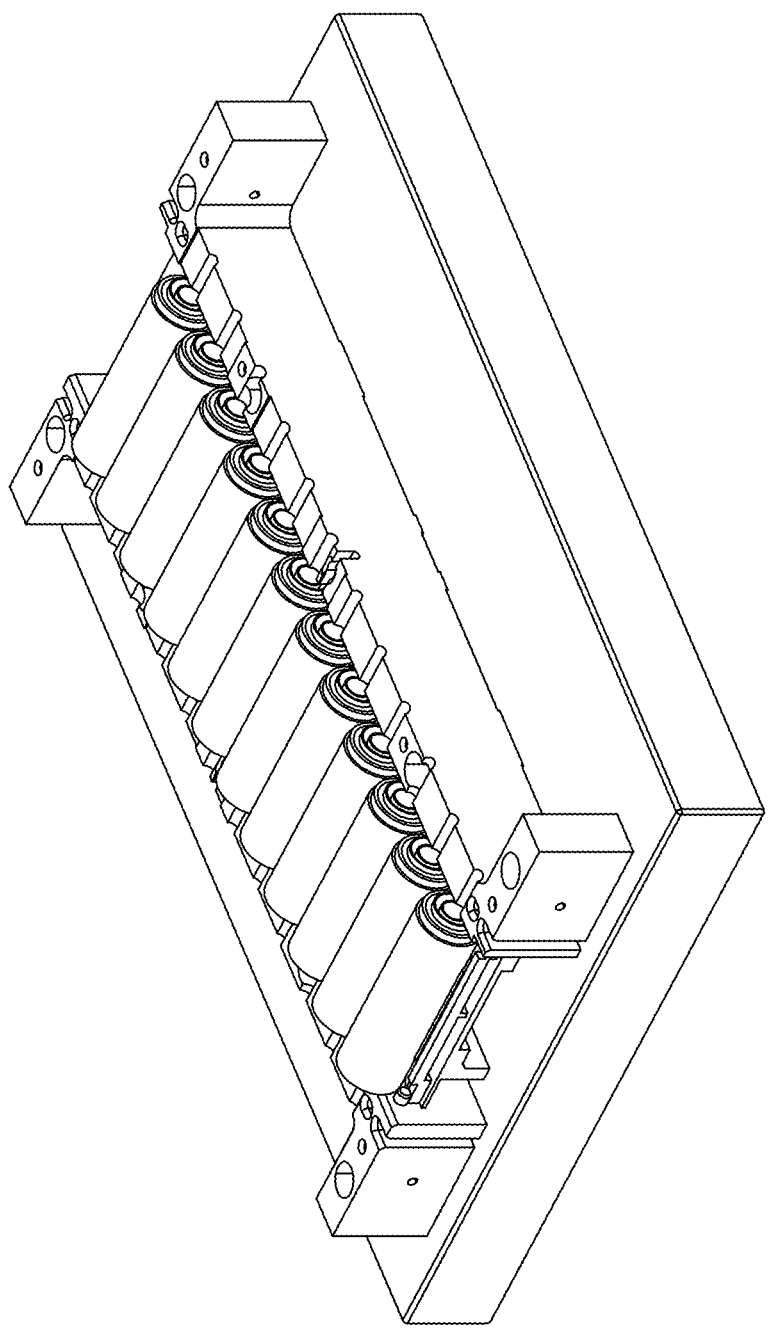
Figure 6B:
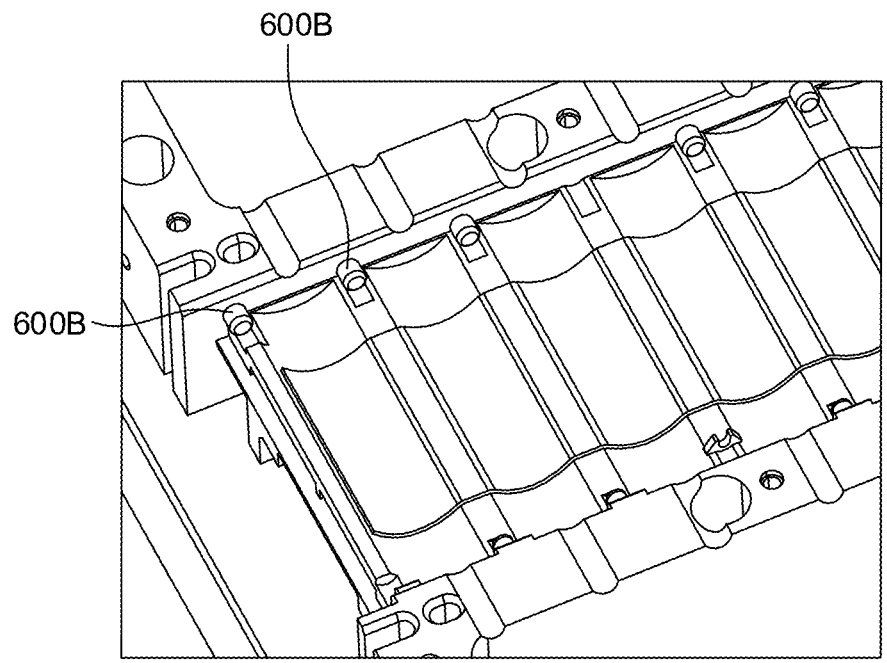
Figure 6C:
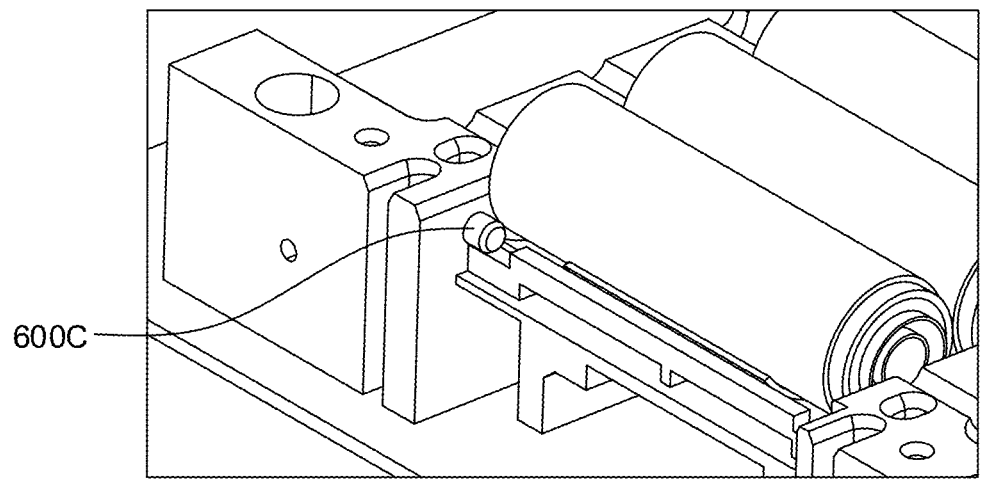

Referring to FIG. 6A, a cell layer 1 is placed onto the insulative layer. In the embodiment of FIG. 6A, the cell layer 1 includes 12 cylindrical battery cells that are each part of the same P Group. FIGS. 6B-6C demonstrate how pins arranged on the respective jigs can be used to fix the position of each cell in the cell layer 1. In an example, magnets may be integrated into each minus side jig to pull the respective cells of each cell layer so that the minus side of each cell layer is flush.

Figure 7A:
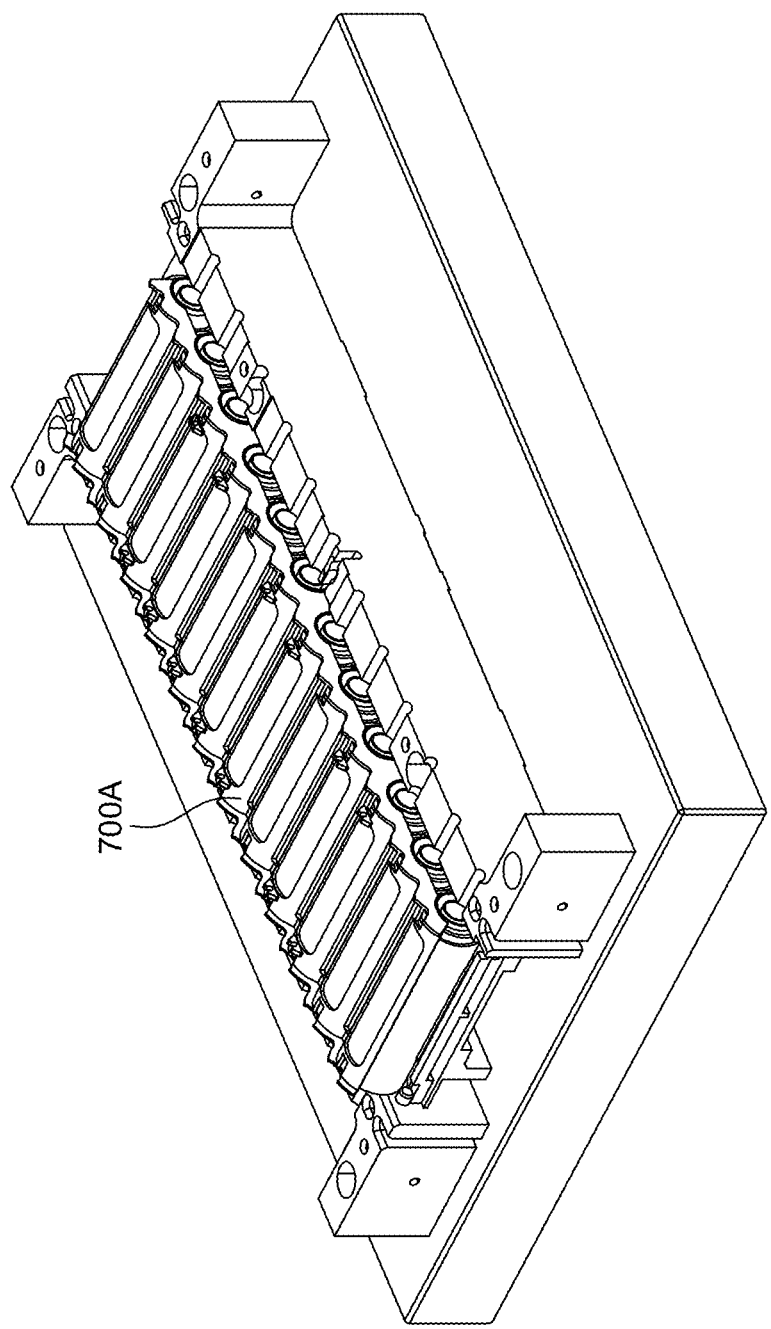
Figure 7B:
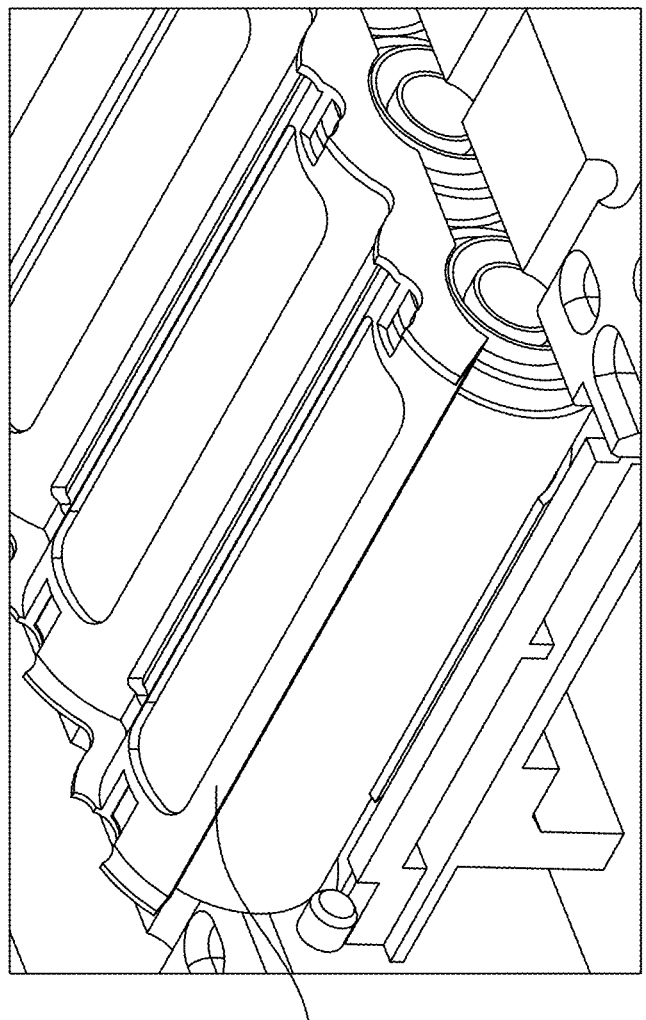

Referring to FIG. 7A, a spacer is added on top of the cell layer 1. The spacer is arranged to define a spacing between the cell layer 1 and a cell layer 2. In an example, the spacer may comprise a piece or several pieces (e.g., made from plastic).

Figure 8A:
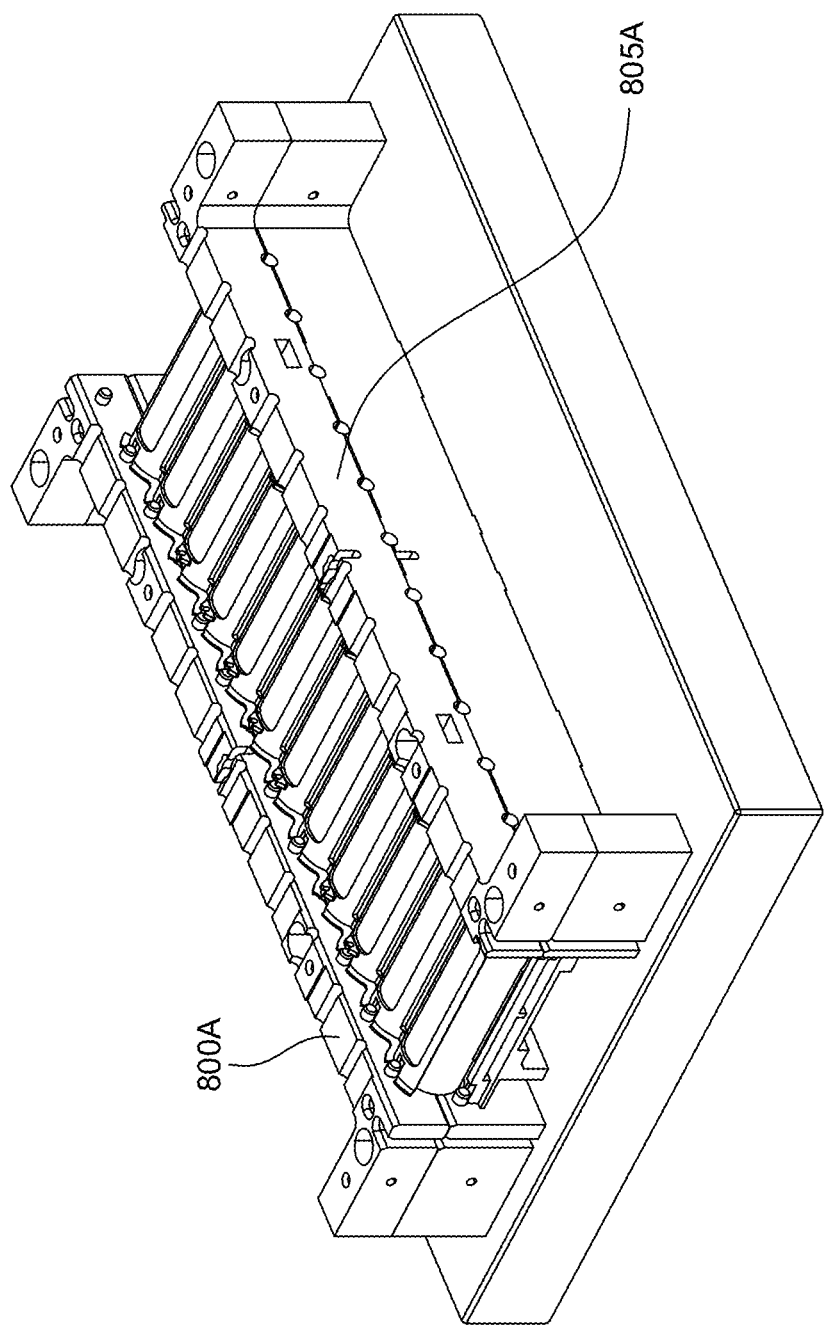

Referring to FIG. 8A, jigs (minus side and plus side) for the cell layer 2 are stacked onto the jigs for the cell layer 1.

Figure 8B:
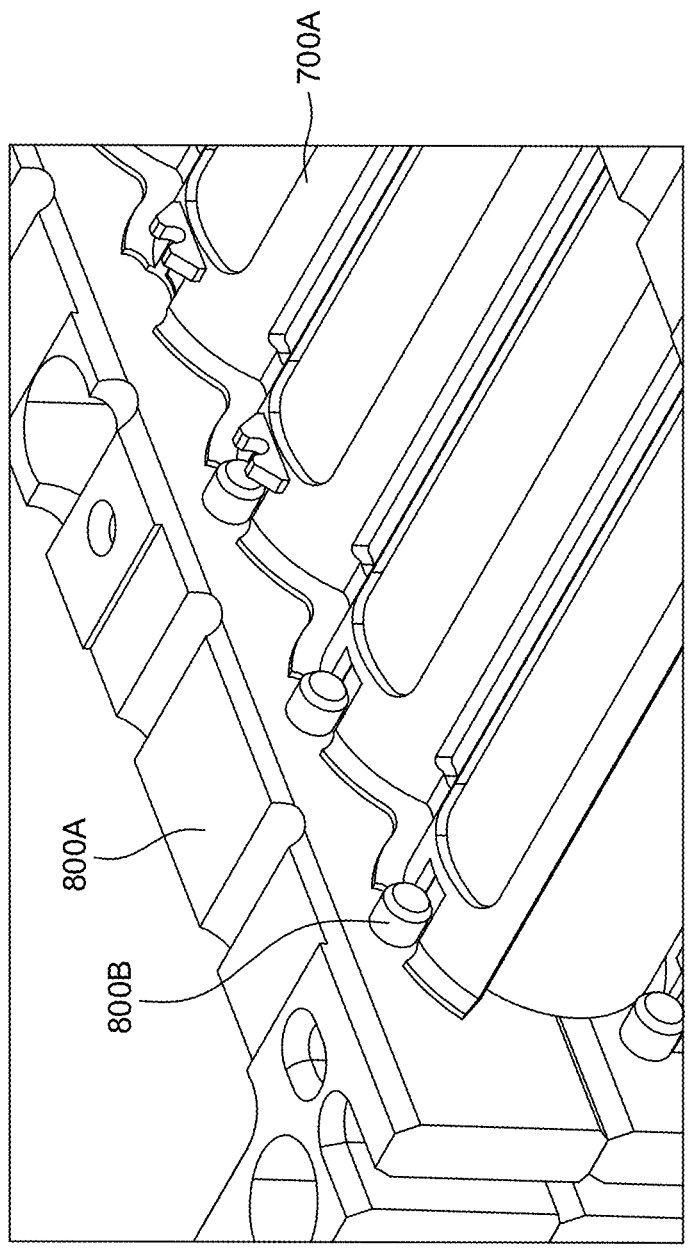

As shown more clearly in FIG. 8B, notches in the spacer between cell layers 1 and 2 are aligned with pins on the jigs for the cell layer 2.

Figure 9A:
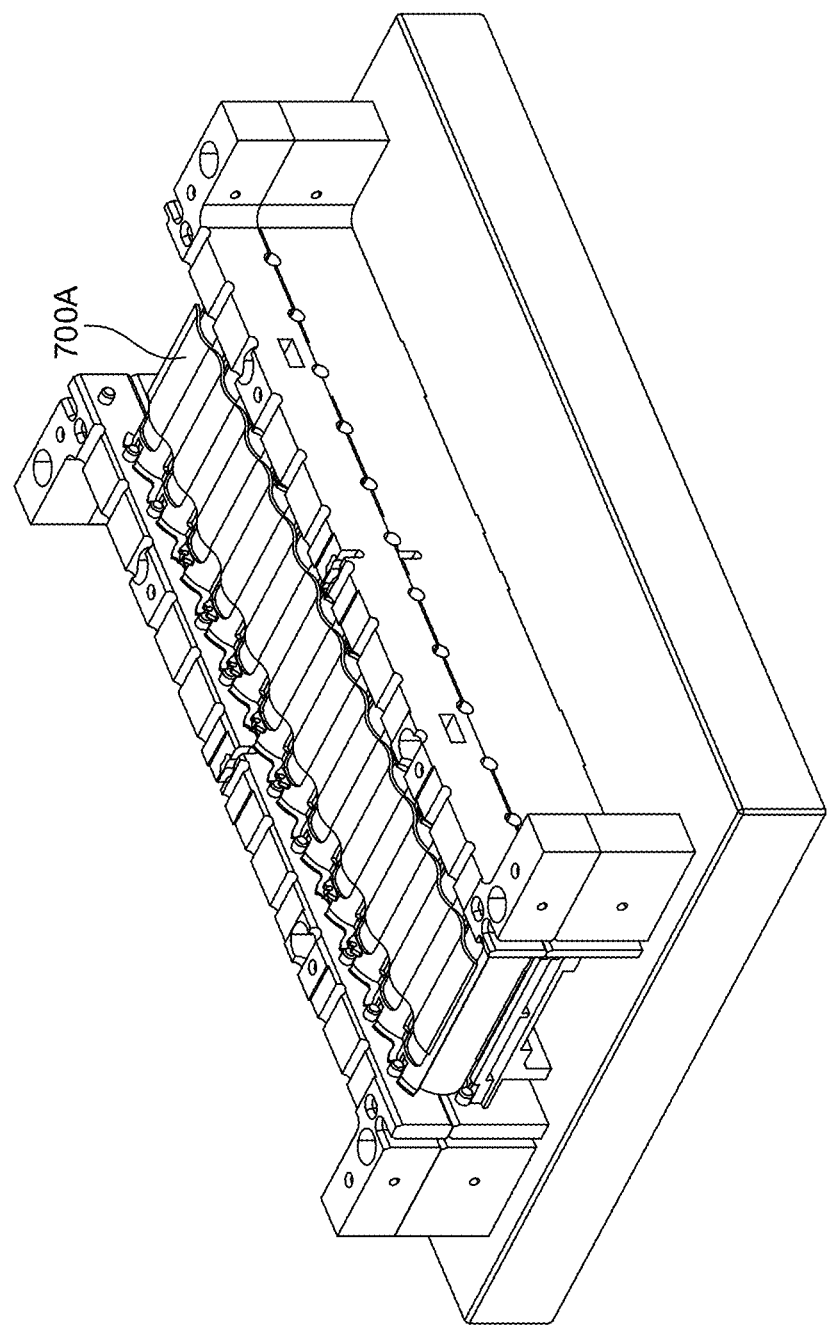

Referring to FIG. 9A, an insulative layer is placed on the spacer between cell layers 1 and 2. While not shown expressly in FIG. 9A, glue may be applied to the insulative layer.

Figure 9B:
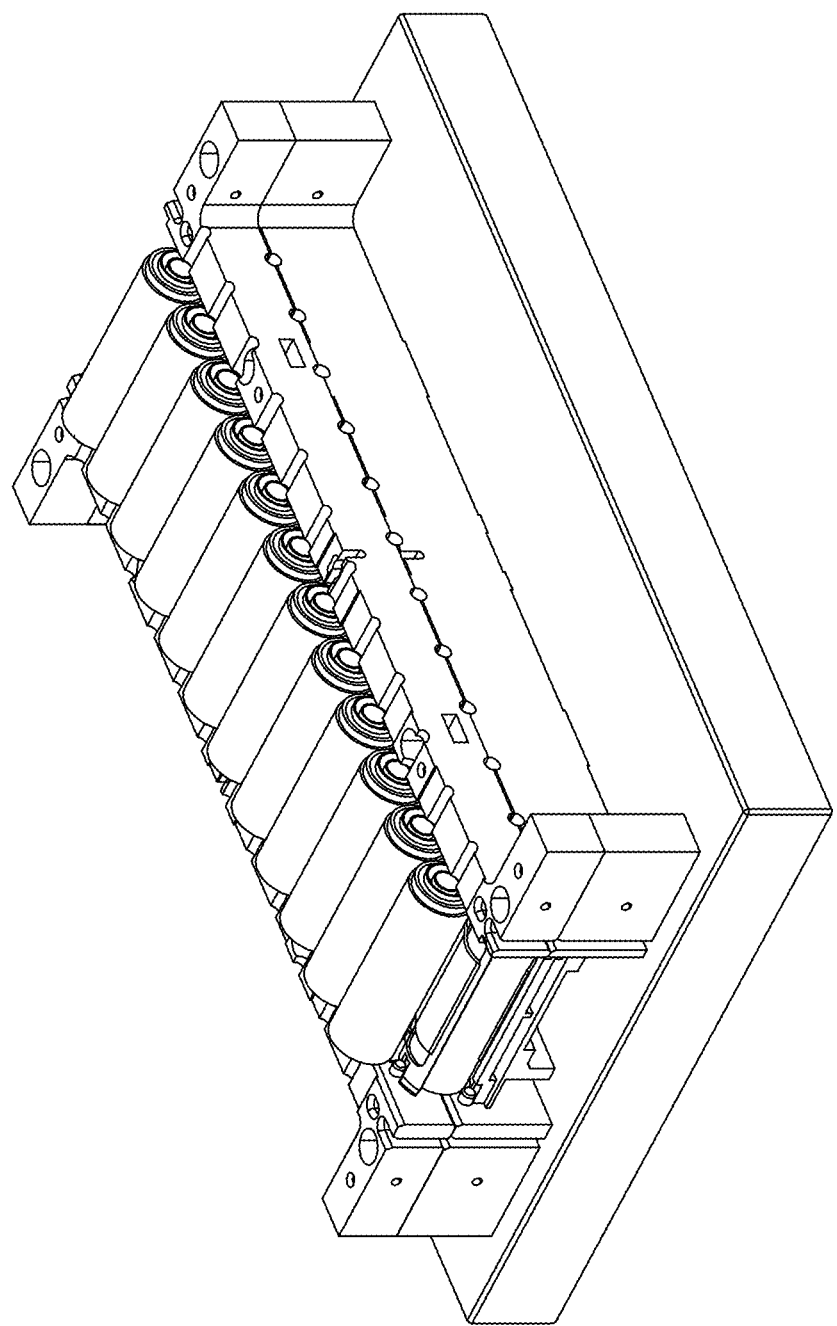

Referring to FIG. 9B, the cell layer 2 is placed onto the insulative layer and secured via the glue. In the embodiment of FIG. 9B, the cell layer 2 includes 12 cylindrical battery cells that are each part of the same P Group. The P Group of cell layer 2 may be the same or different from the P Group of cell layer 3, depending on the configuration of contact plate(s) used in the battery module (described below in more detail).

Figure 10:
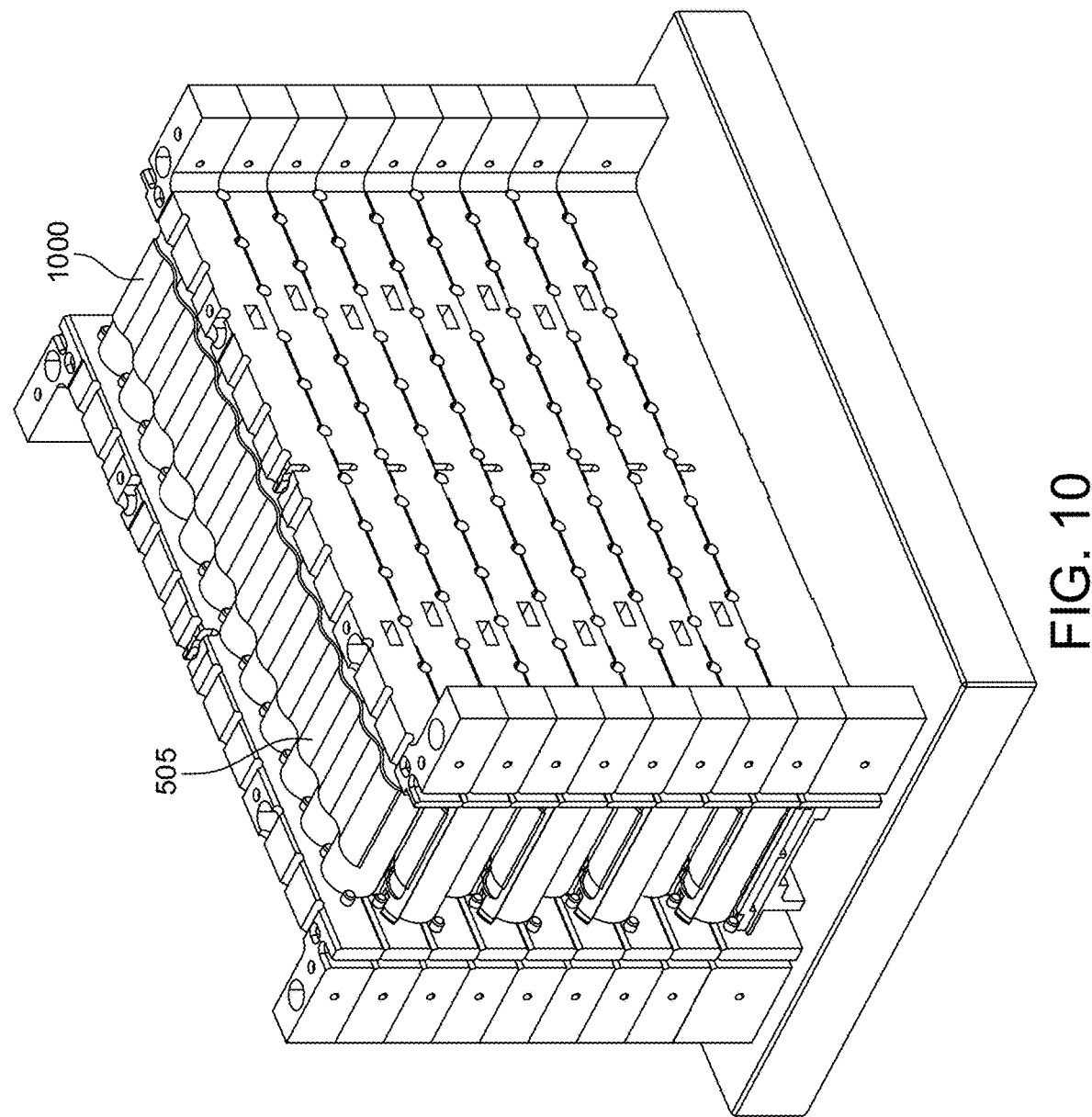
Figure 11:
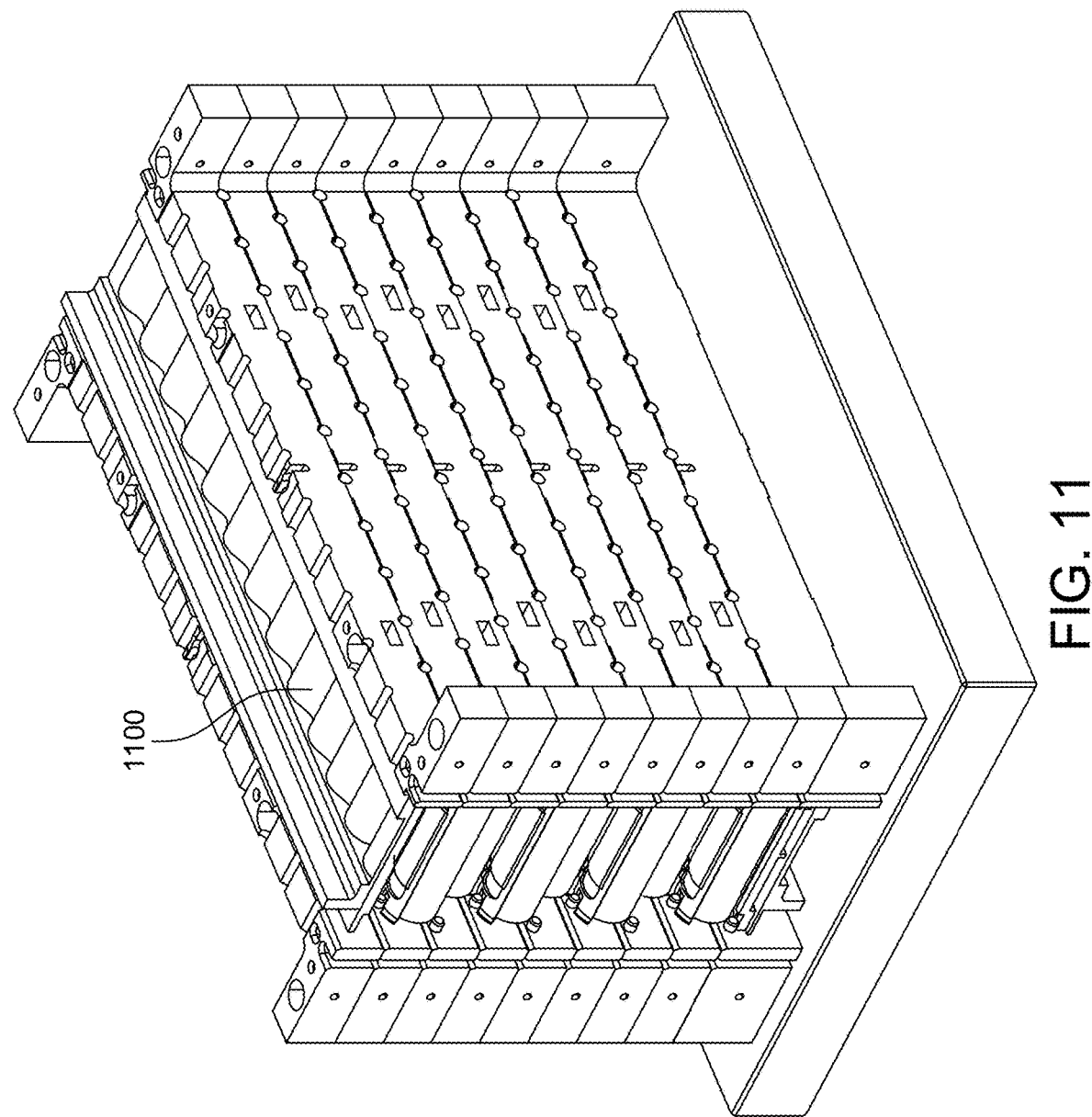
Figure 12A:
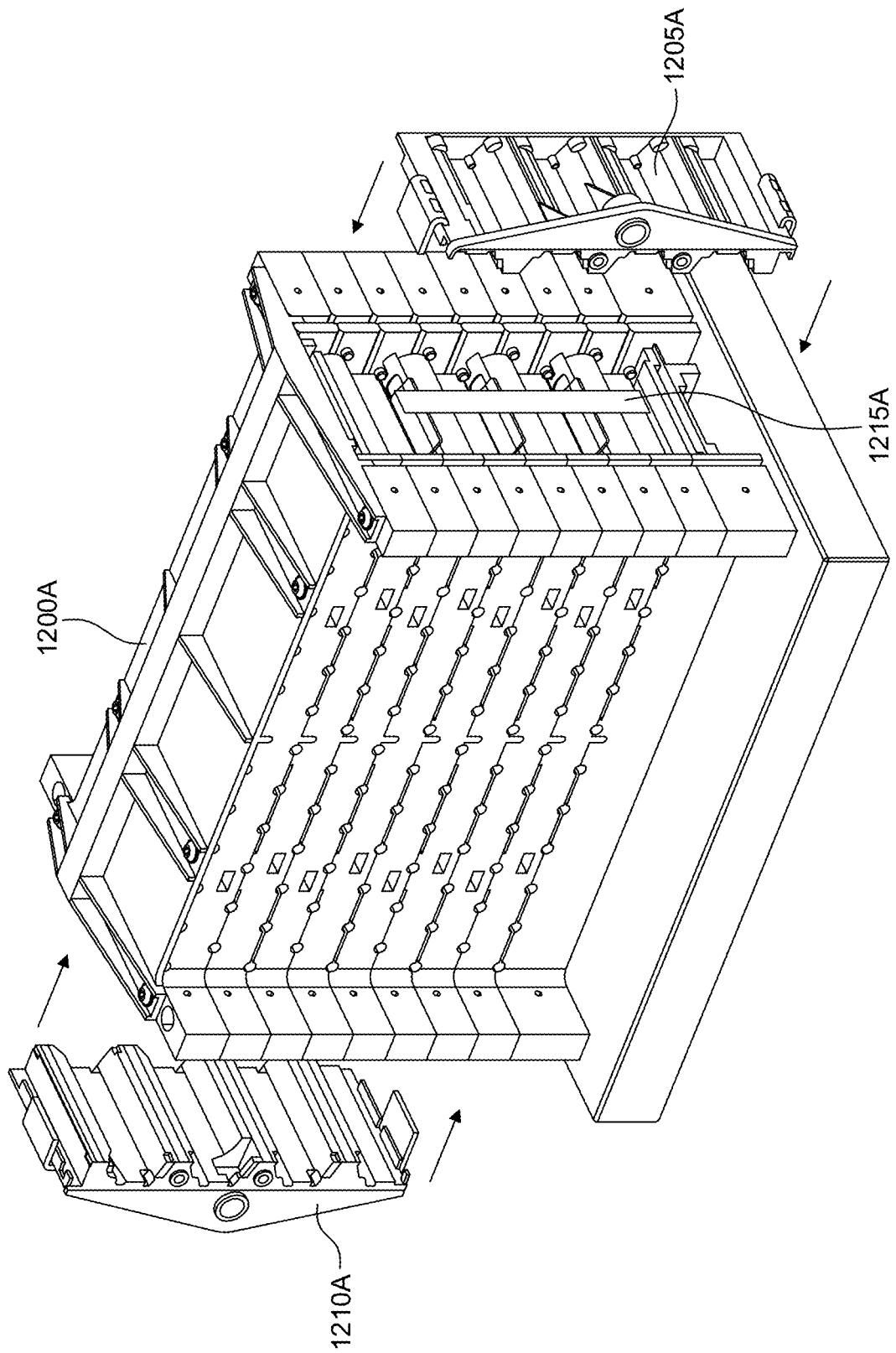
Figure 12B:
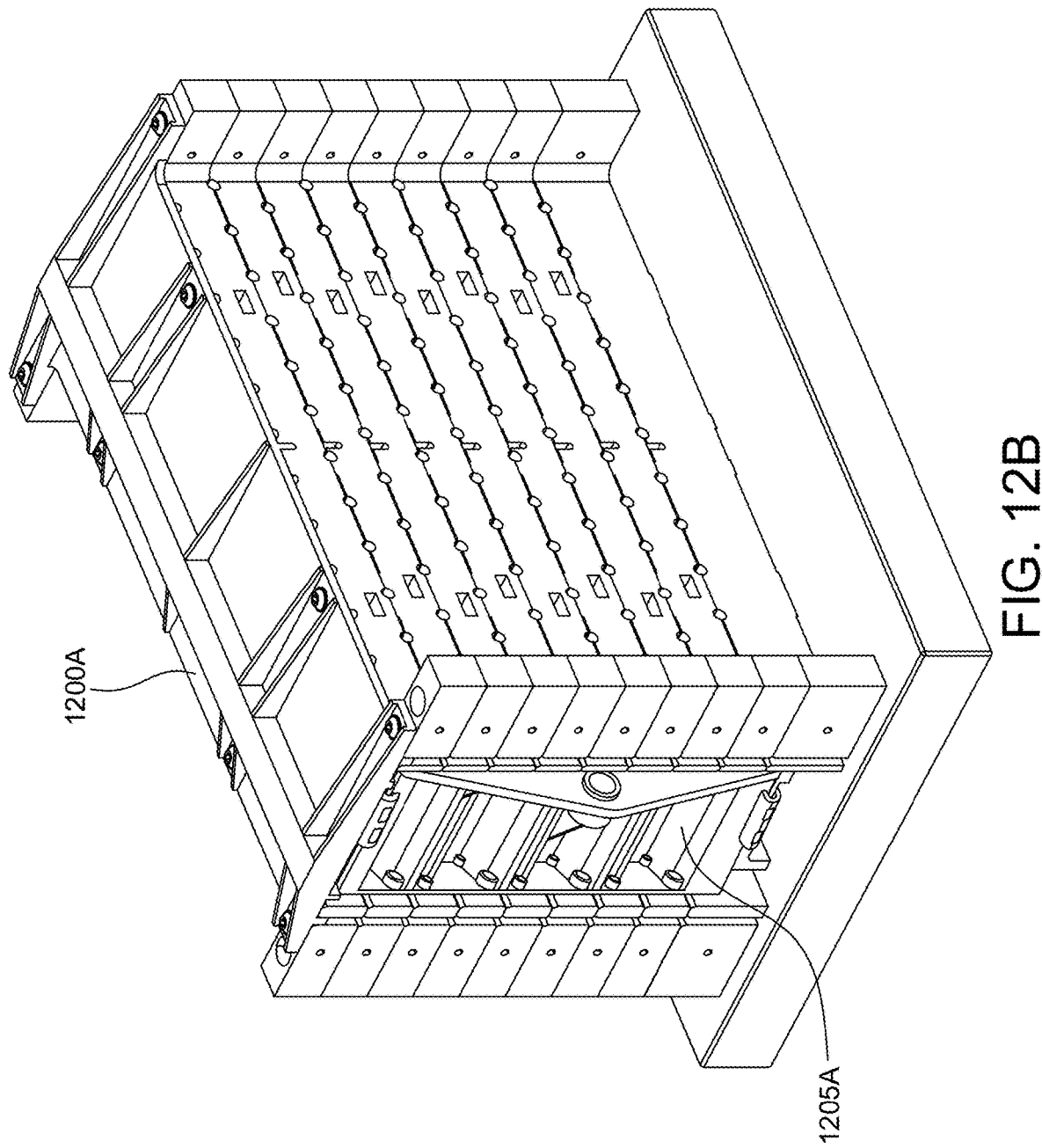
Figure 13:
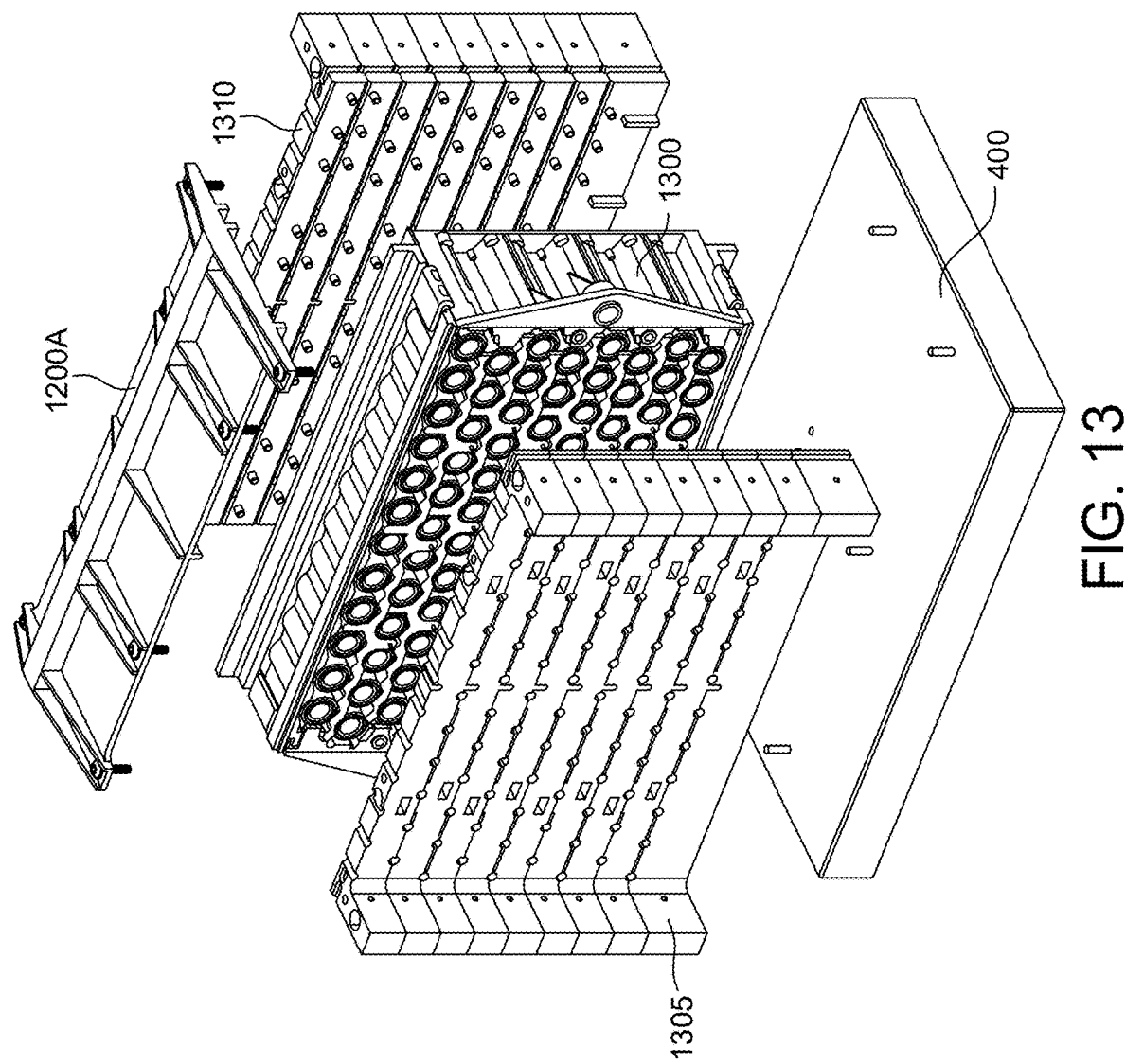

At this point, the processes depicted in FIGS. 7A-9B may repeat a given number of times until a desired number of cell layers are constructed, resulting in the arrangement depicted in FIG. 10 including cell layers 1-8. As shown in FIG. 10, glue is applied to the top-most insulative layer, after which another external frame component is attached to the top-most insulative layer as shown in FIG. 11. As shown in FIGS. 12A-12B, a top jig is added, after which opposing sidewalls are attached via glue. The battery module is then separated from the respective jigs and the base plate as shown in FIG. 13.

Figure 14A:
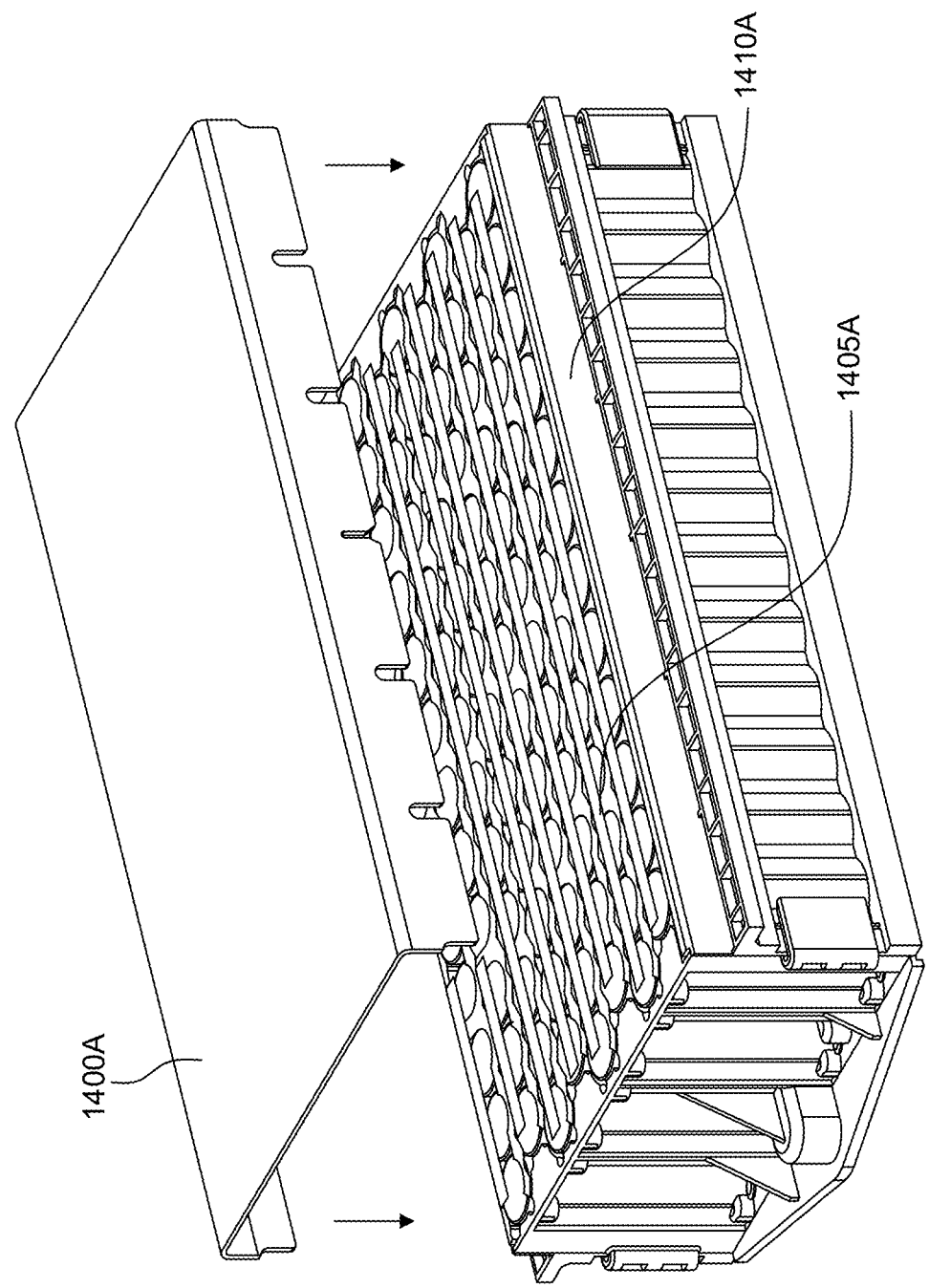
Figure 14B:
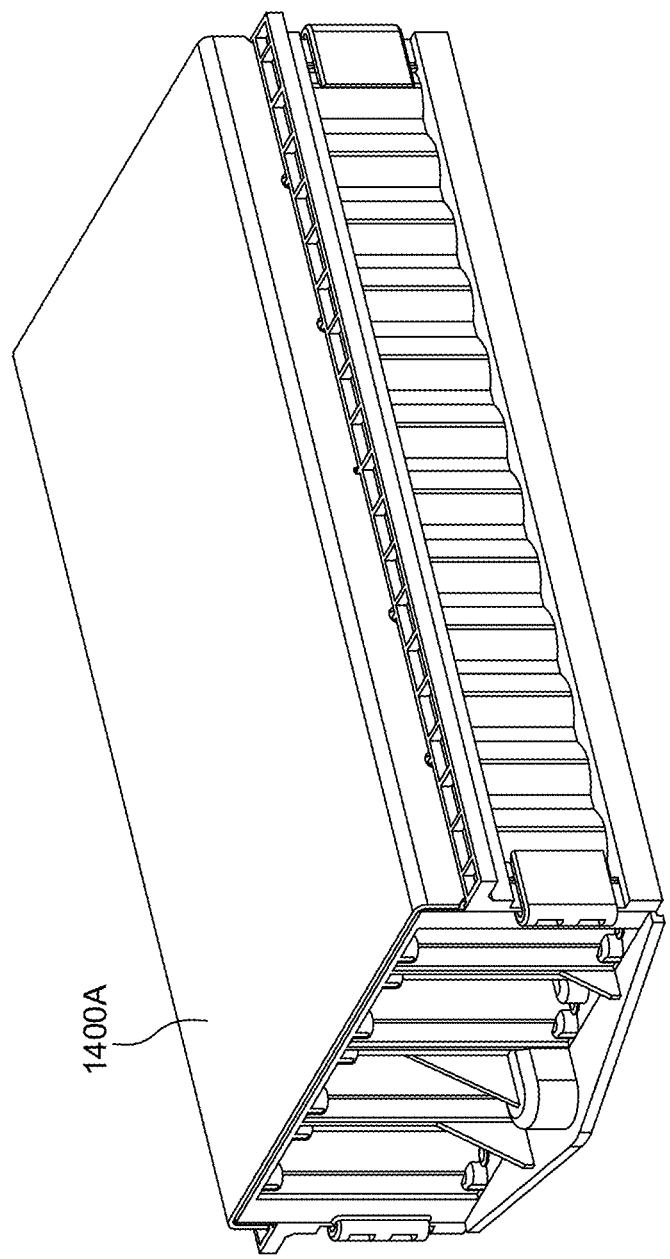

Referring to FIGS. 14A-14B, a bottom plate is secured to the battery module via glue.

Figure 15A:
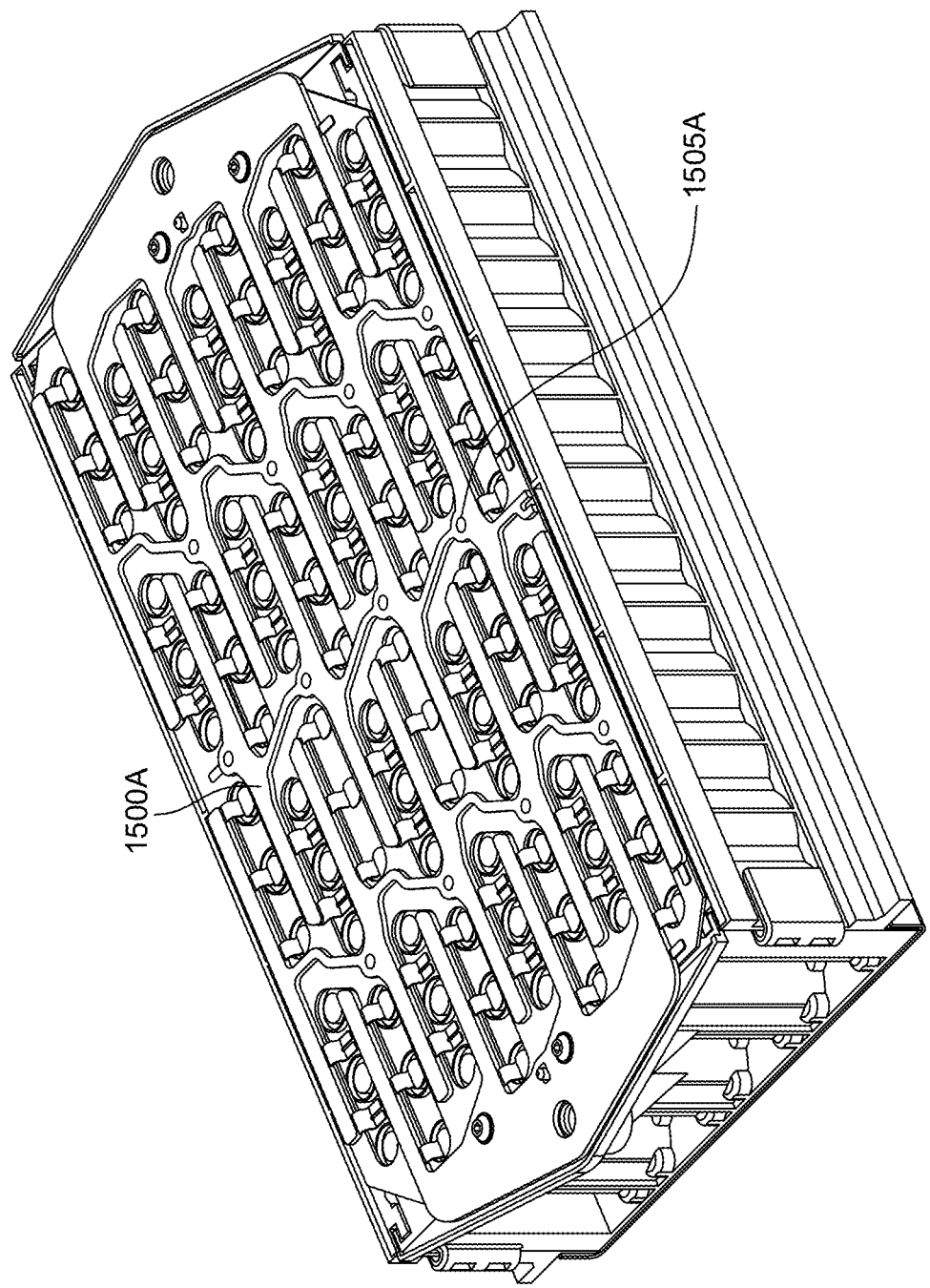
Figure 15B:
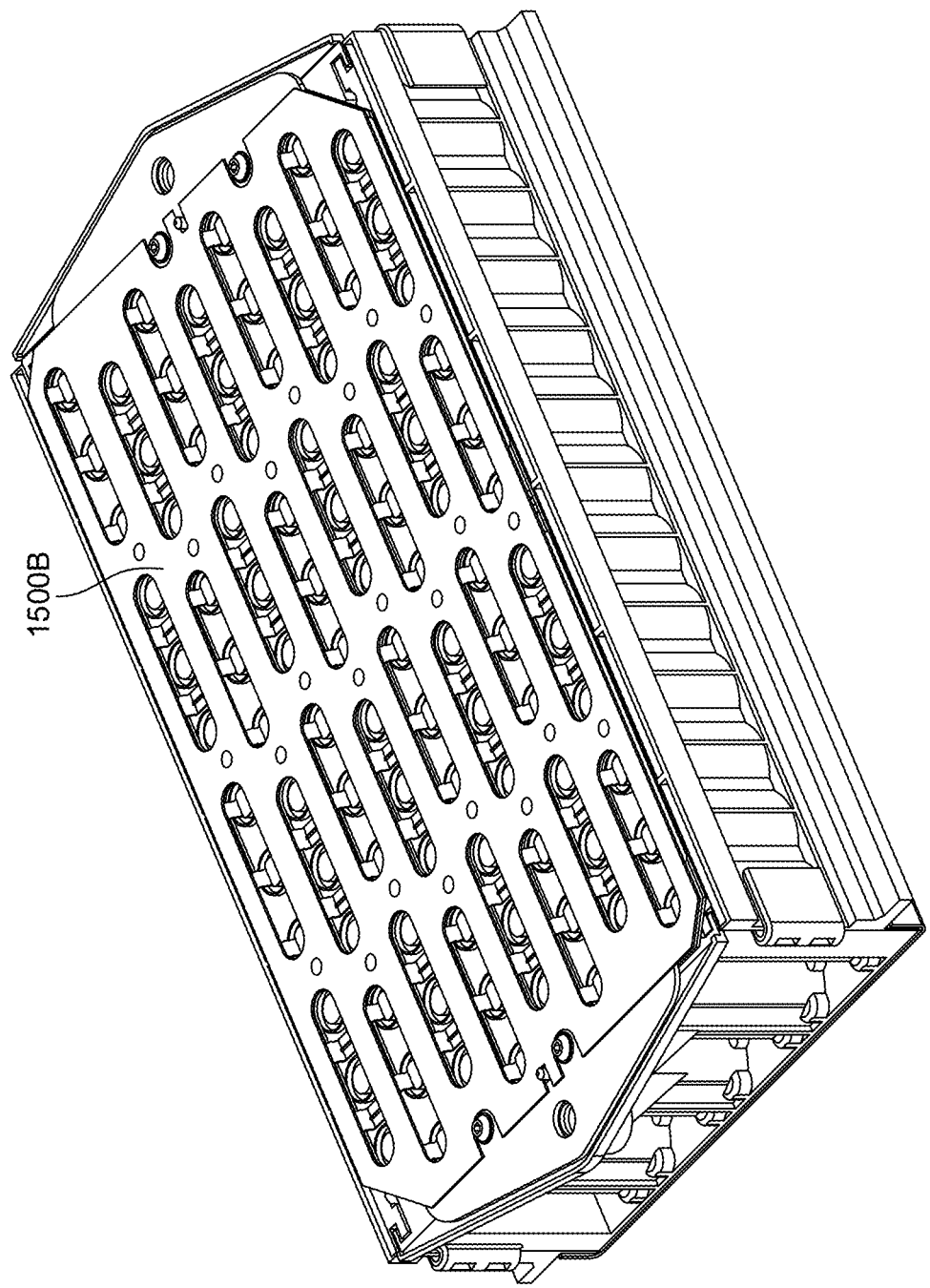
Figure 15C:
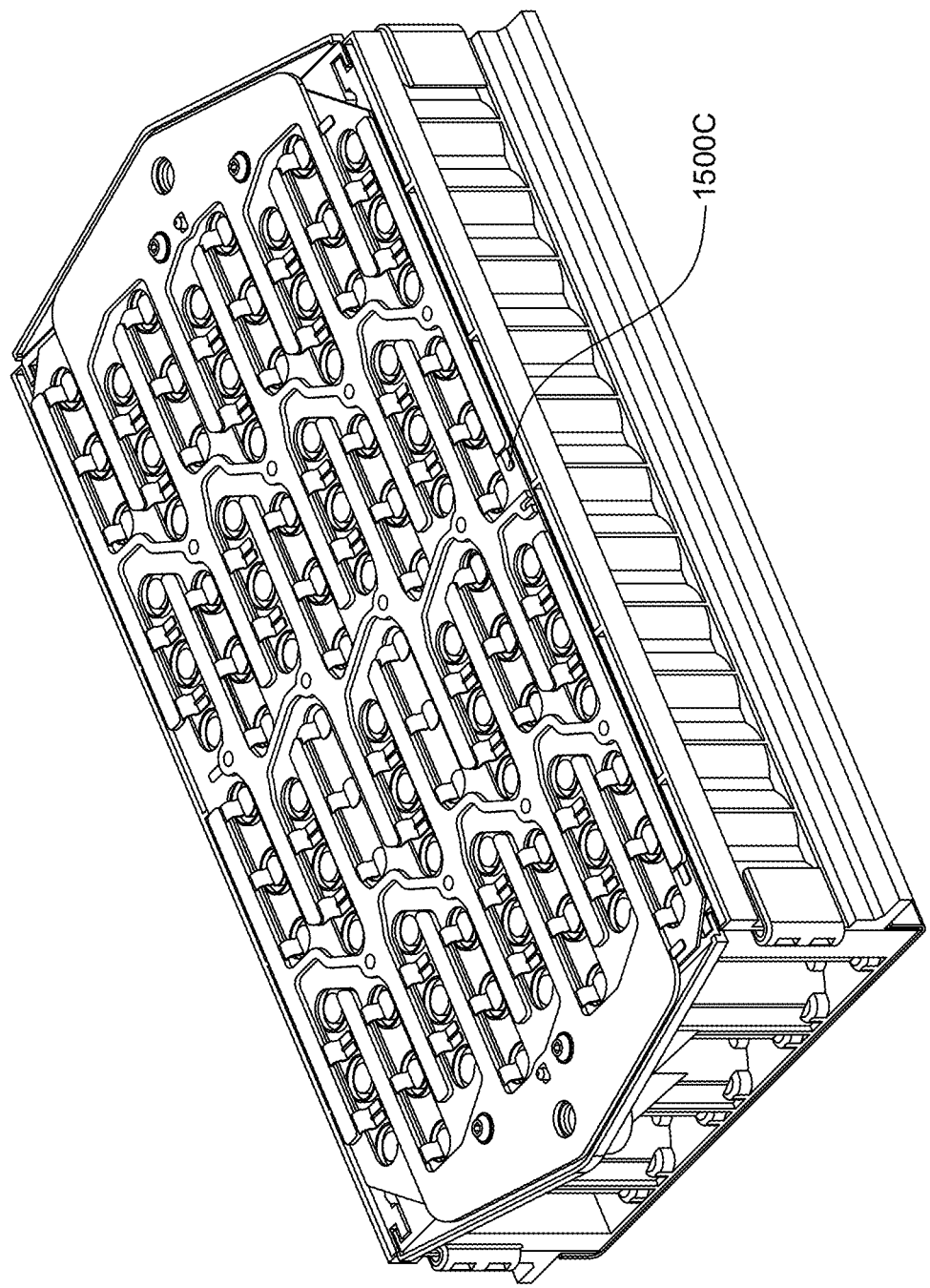

Referring to FIG. 15A, a conductive plate (or contact plate) is arranged over the battery cells (e.g., fixed with glue). FIG. 15B depicts an alternative contact plate that comprises 2-layer foil. Examples of contact plates are described at least with respect to FIGS. 7A-8B of U.S. Patent Publication No. 2018/0108886A1, entitled "Multi-layer contact plate configured to establish electrical bonds to battery cells in a battery module", and hereby incorporated by reference in its entirety. Referring to FIG. 15C, the contact plate of FIG. 15A may further include contact tabs onto which sensor wire may be connected (e.g., thermistors).

Figure 16B:
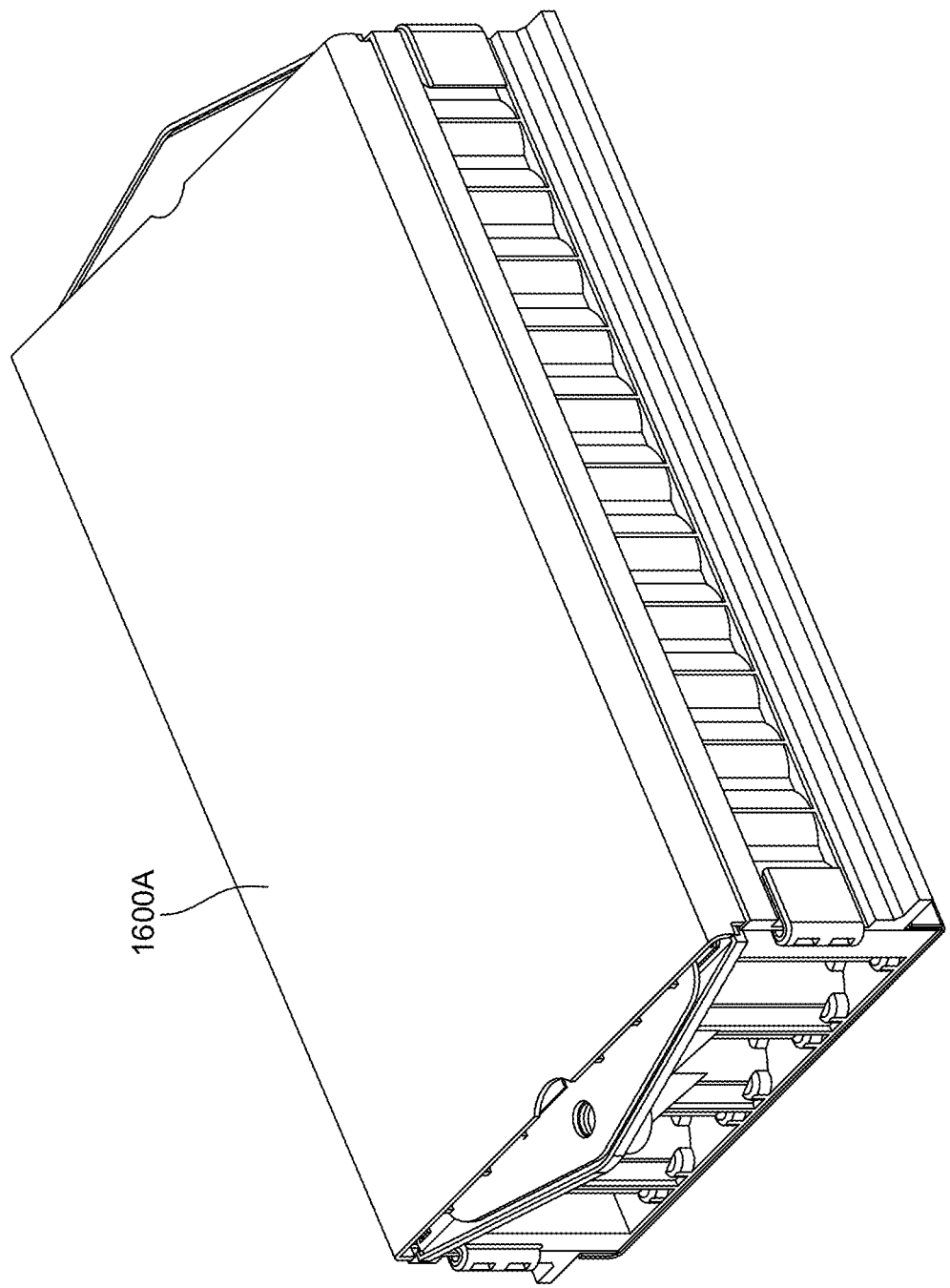

Referring to FIGS. 16A-16B, a cover is added to the battery module (e.g., via glue). At this point, the battery module is complete and may be deployed as part of an energy storage system (e.g., for an electric vehicle). The external parts of the battery module (e.g., external frame components, sidewalls, bottom plate and cover) collectively comprise a battery housing for the battery cells contained therein.

Figure 17:
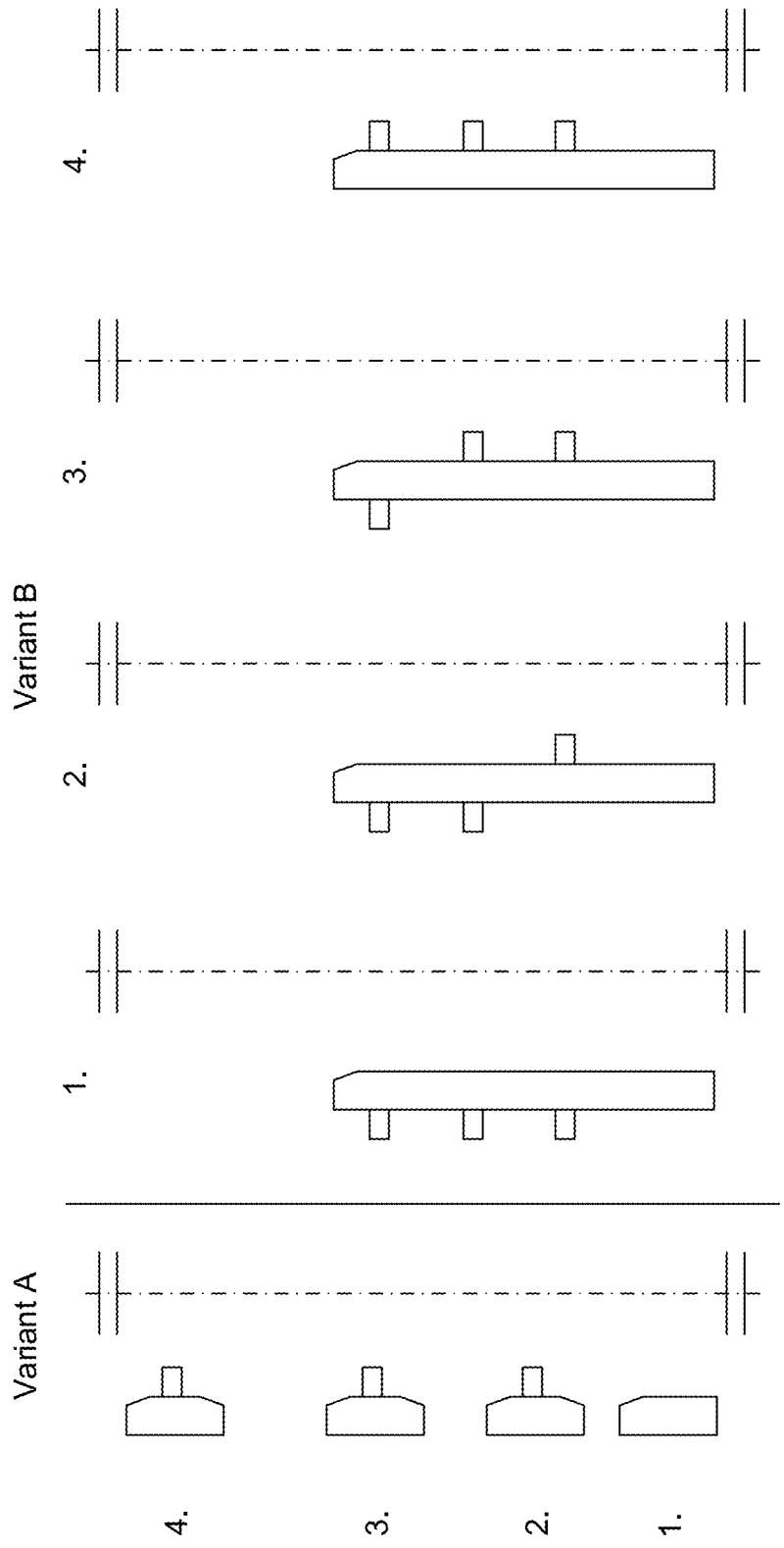
FIG. 17 illustrates two variants of pin arrangements in an assembly device.

FIG. 17 illustrates two variants of pin arrangements in the assembly device (i.e., in the minus side and plus side jigs). In variant A, the pins are fixed on different jigs and are added when each new jig is added as illustrated in FIGS. 4-16B. In variant B, a jig tower that comprises a plurality of stacked jigs and/or a single large structure (one large jig comprising multiple cell layers) is used, whereby pins can be set to a withdrawn position (not inserted) or an inserted position. In variant B(1), each pin of the jig tower is withdrawn. In variant B(2), the pin for cell layer 1 is inserted. In variant B(3), the pin for cell layers 1 and 2 are inserted. In variant B(3), the pin for cell layers 1-3 are inserted. As will be appreciated, the jig tower can span any number of cell layers, and multiple jig towers and/or individual jigs can be stacked together as well.

Figure 18:
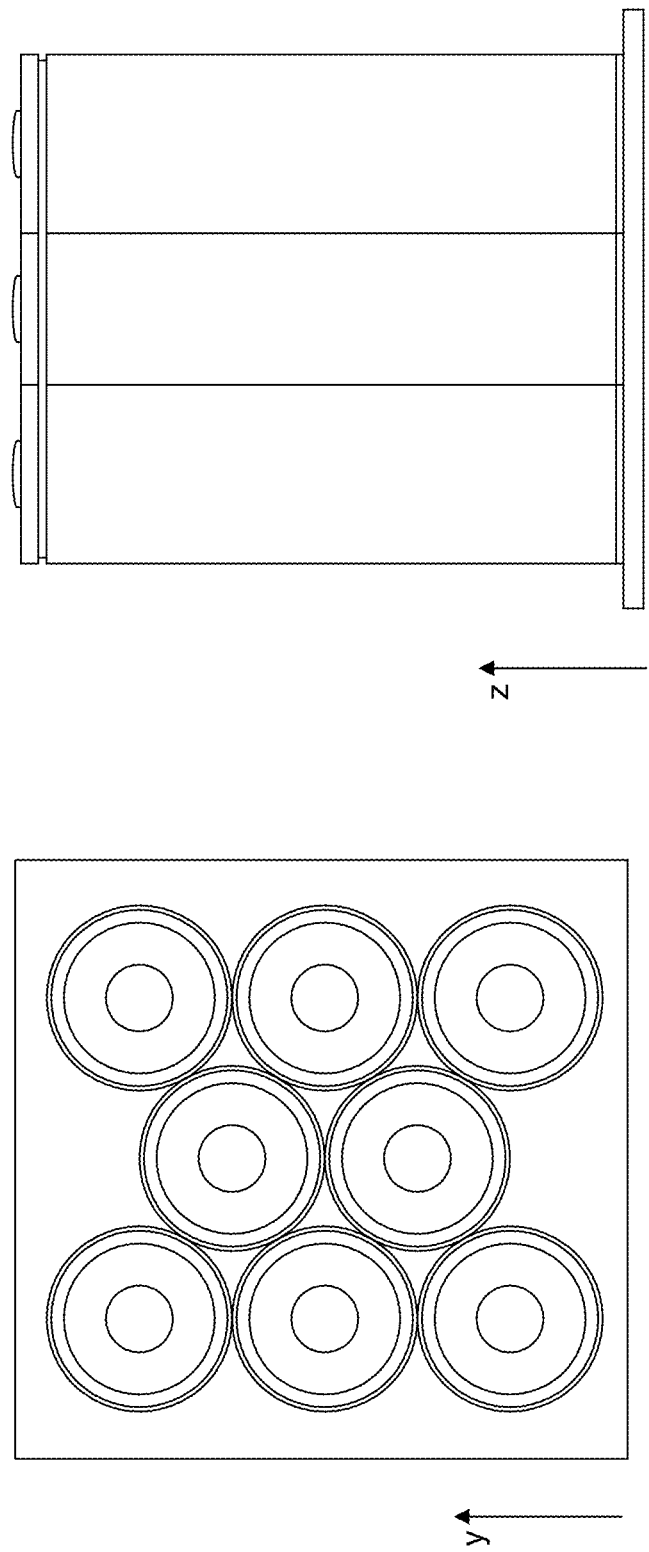
FIG. 18 illustrates a coordinate system (x, y, z) for battery cell arrangements.

Referring to FIG. 18, a coordinate system (x, y, z) is defined for battery cell arrangements is defined. In an example, the battery cells depicted in FIG. 18 may correspond to a sampling of battery cells arranged in three adjacent cell layers during the process of FIGS. 4-17.

Using conventional methodologies, forming bond connections between contact plates and cell terminals is both labor-intensive and time-intensive during battery module assembly. For example, one such conventional methodology of forming such bonding connections is described in U.S. Pat. No. 7,671,565 B2.

Embodiments of the disclosure are directed to a multi-layer contact plate whereby a set of inter-layer connection points are defined so as to have low electrical resistance and a strong mechanical connection. In an example, the set of inter-layer connection points can be produced via local soldering (or spot soldering) and/or brazing. In an example, the multi-layer contact plate may comprise two layers or three layers, and these layers may be produced from the same or different materials. In an example, descriptions of suitable multi-layer contact plates to which the embodiments of the present disclosure may be applied is described in U.S. Publication No. 2008/0108886, which is hereby incorporated by reference in its entirety.

Figure 19:
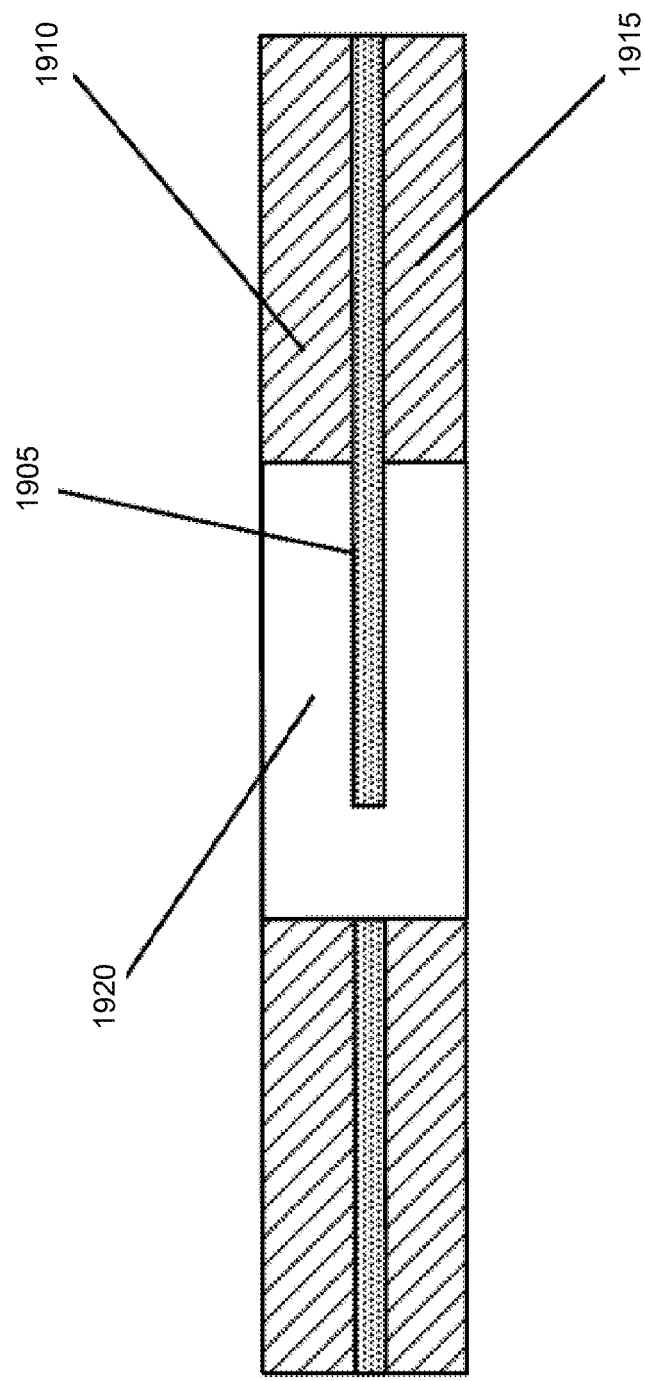
FIG. 19 illustrates a side-perspective of a portion of a multi-layer contact plate 1900 in accordance with an embodiment of the disclosure.

FIG. 19 illustrates a side-perspective of a portion of a multi-layer contact plate 1900 in accordance with an embodiment of the disclosure. In particular, the multi-layer contact plate 1900 is depicted as a three-layer contact plate. In one embodiment, a cell connection terminal layer of the multi-layer contact plate 1900 is implemented as a middle or intermediate sheet that 1905 that is sandwiched between more highly conductive (e.g., Al or Cu) solid plate sections 1910 and 1915 (e.g., primary conductive layers). In an example, contact area 1920 may correspond to "holes" in the multi-layer contact plate 1900 at which bonding connectors are joined to terminals of battery cells (not shown) which are arranged underneath the multi-layer contact plate 1900. In other words, the bonding connectors are not threaded "through" the contact area 1920 like a needle (e.g., with the bonding connectors being attached to a top portion of the multi-layer contact plate 1900 that is outside of the "hole" or contact area 1920). Rather, in certain embodiments, the bonding connectors may be formed from an integrated cell terminal connection layer (e.g., the intermediate sheet 1905), such that the bonding connectors can be said to protrude out of (or join with) an interior sidewall of the "hole" or contact area 1920 itself. Hence, bonding connectors configured in this manner (e.g., from an integrated layer within the multi-layer contact plate) help to form an electrical connection from a cell terminal to a position "in" the hole, instead of "through" the hole. Accordingly, the portion of the intermediate sheet 1905 in the contact area 1920 may be used as a bonding connector (or ribbon) to connect to a positive or negative terminal of a battery cell (e.g., by pushing the bonding connector downwards and then welding the bonding connector onto a cell terminal). In an example, as will be described below in more detail, the portion of the intermediate sheet 1905 in the contact area 1920 may include one or more contact tabs that are configured to be welded to positive and/or negative top-facing terminals of a battery cell.

In other embodiments, the multi-layer contact plate 1900 may alternatively comprise two layers (e.g., 1905 and 1910, or 1905 and 1915). Hence, a three-layer multi-layer contact plate need not be used in all embodiments.

An example material configuration of the multi-layer contact plate 1900 of FIG. 19 is as follows:

Intermediate Sheet 1905: e.g., Hilumin with a sheet metal thickness in a range of about 0.05 to about 0.50 mm, e.g., preferably about 0.15 mm; and Solid Plate Sections 1910 and 1915: e.g., Al or Cu with a sheet metal thickness in a range of about 0.1 to about 3.0 mm, e.g., preferably about 1.0 mm.

Further, in embodiments of the disclosure, a soldering or brazing material may further be arranged between the layers 1905 and 1910 or between the layers 1915 and 1915. In an example, the soldering or brazing material may comprise a soldering/brazing paste (e.g., zinc-aluminum with flux, aluminum-silicon with flux or silicon with flux, as well as soldering/brazing material without flux). A thickness of the soldering or brazing material can be in a range of about 1 µm to about 0.3 mm, e.g., preferably about 0.05 mm.

An example by which a multi-layer contact plate can be produced in accordance with an embodiment of the disclosure will now be described in detail with respect to FIGS. 20-25.

Figure 20:
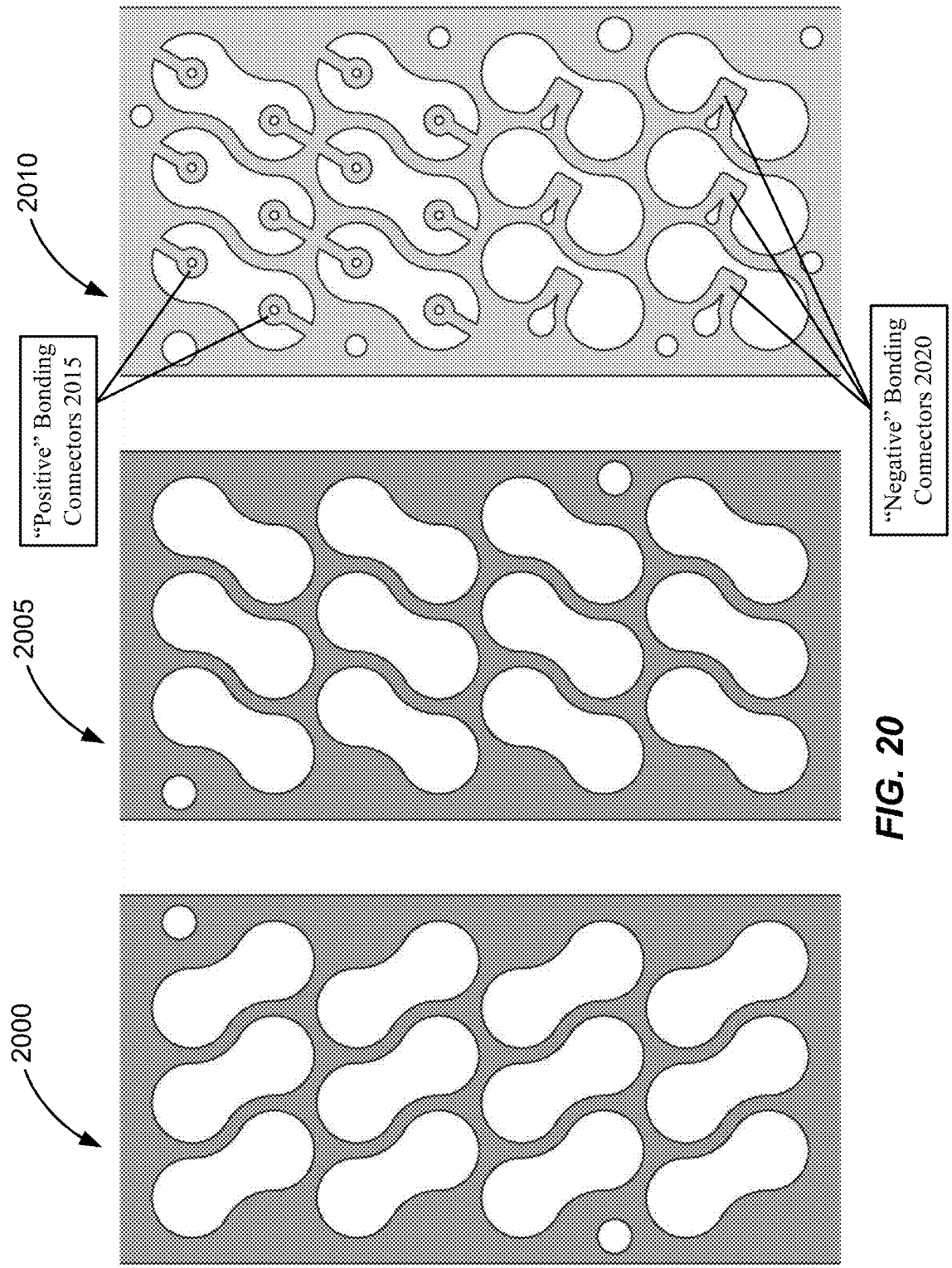
FIG. 20 illustrates an example configuration for plate sections and an intermediate sheet for a multi-layer contact plate in accordance with an embodiment of the disclosure.

In a first production phase, as shown at FIG. 20, various holes are defined in plate sections 2000 and 2005 and intermediate sheet 2010. When joined, these holes may correspond to contact areas as discussed above with respect to FIG. 19. As shown in FIG. 20, positive and negative bonding connectors 2015 and 2020 are arranged inside of the holes of the intermediate sheet 2010. These bonding connectors may be pressed downwards and welded onto positive and negative cell terminals, respectively, of battery cells arranged underneath the multi-layer contact plate (once the respective layers are joined). In an example, the various holes defined in plate sections 2000 and 2005 and intermediate sheet 2010 may be produced via punching, etching, laser cutting, waterjet cutting or any combination thereof.

Figure 21:
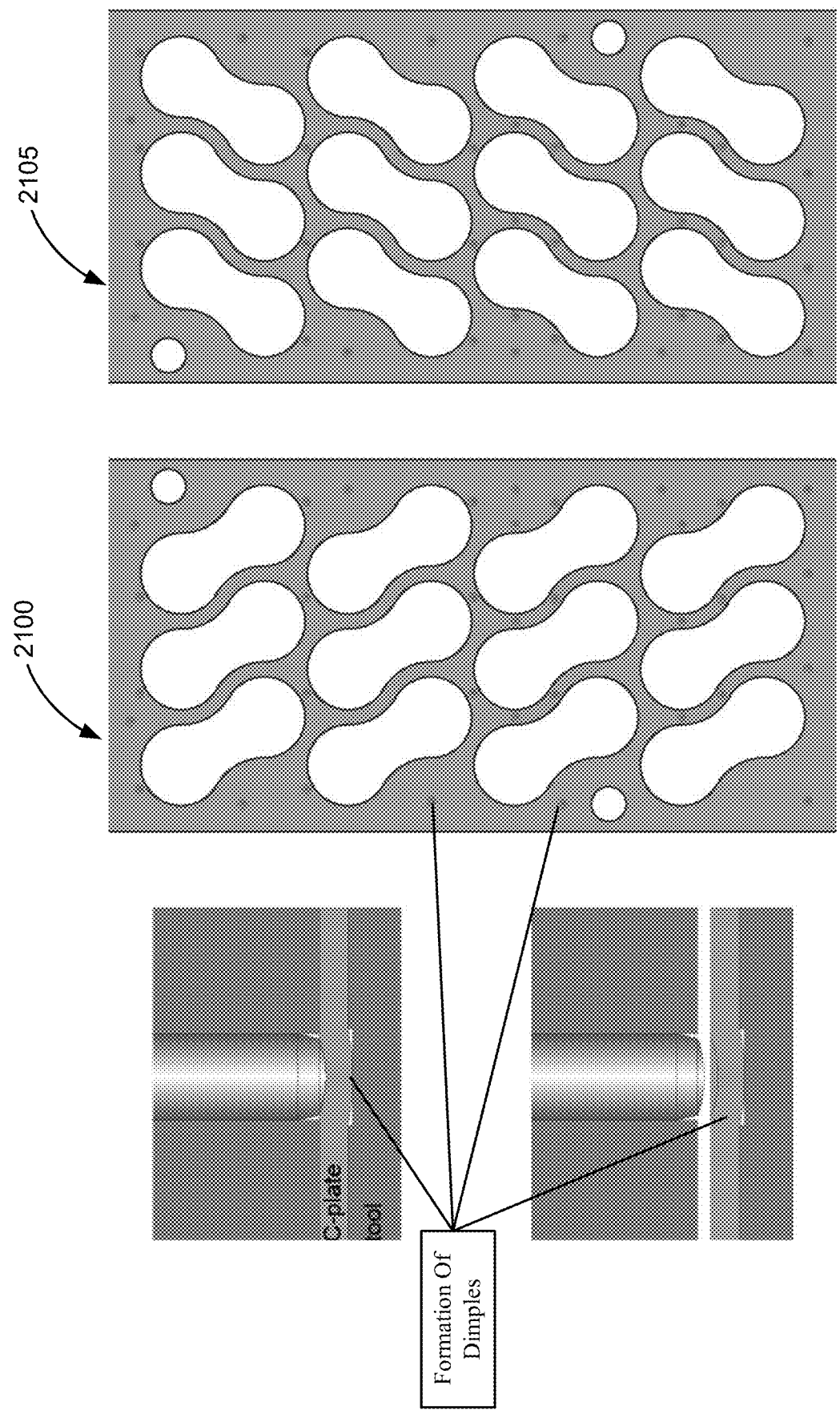
FIG. 21 illustrates an example configuration of mechanically pre-defined dimples in the plate sections and intermediate sheet of FIG. 20 in accordance with an embodiment of the disclosure.

In a second production phase, as shown at FIG. 21, dimples are distributed across the plate sections 2000 and 2005 to produce dimpled plate sections 2100 and 2105 (e.g., using some form of dimple tool). In alternative embodiments, these dimples may be added to the intermediate sheet 2010 instead of the plate sections 2005 and 2010. In another embodiment, the second production phase can be skipped and the plate sections 2000 and 2005 may be used without dimples.

Figure 22:
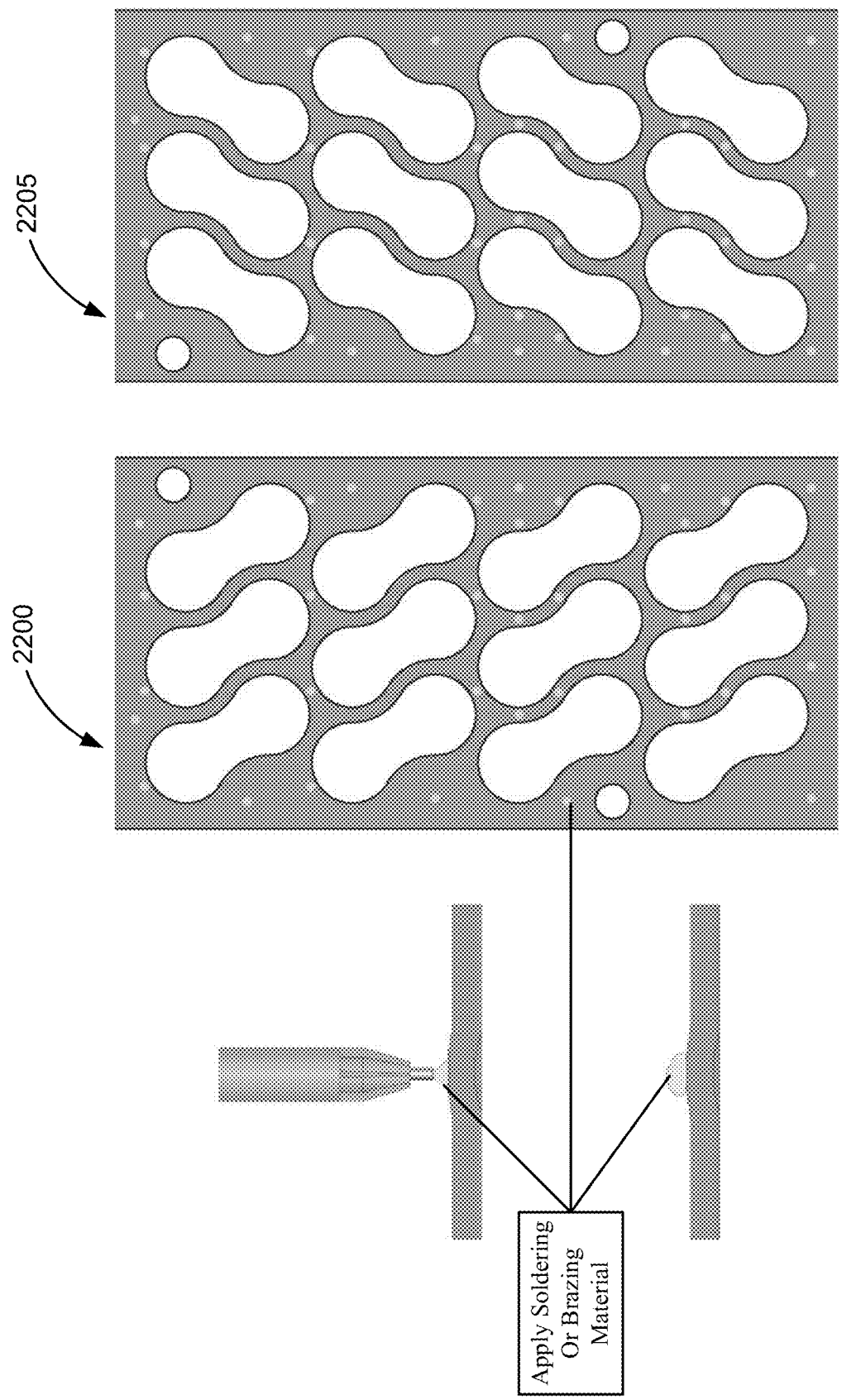
FIG. 22 illustrates soldering or brazing material being added to the mechanically pre-defined dimples in the plate sections and intermediate sheet of FIG. 21 in accordance with an embodiment of the disclosure.

In a third production phase, as shown at FIG. 22, soldering or brazing material is added to the plate sections 2100 and 2200 to produce braze-ready or solder-ready plates sections 2200 and 2205. In an example, the soldering or brazing material is added specifically to the raised dimple sections of the plate sections 2100 and 2200.

In an example, the dimples correspond to small dips in the surfaces of the plate sections 2200 and 2205. For example, the dimples may have a height in the z-direction of about 1 µm to about 0.3 mm, e.g., preferably about 0.05 mm. Due to the boundary conditions of the soldering or brazing material in a liquid phase forming a very local joint (or inter-layer connection point) that replaces air, oxide, dust, dirt and/or flux from the joint. In an example, localized inter-layer connection points may be more reliable (e.g., higher mechanical strength and/or a lower-resistance electrical connection across the multi-layer contact plate) than attempting to arrange surface joints across the entire surfaces of the plate sections and intermediate sheet.

Figure 23:
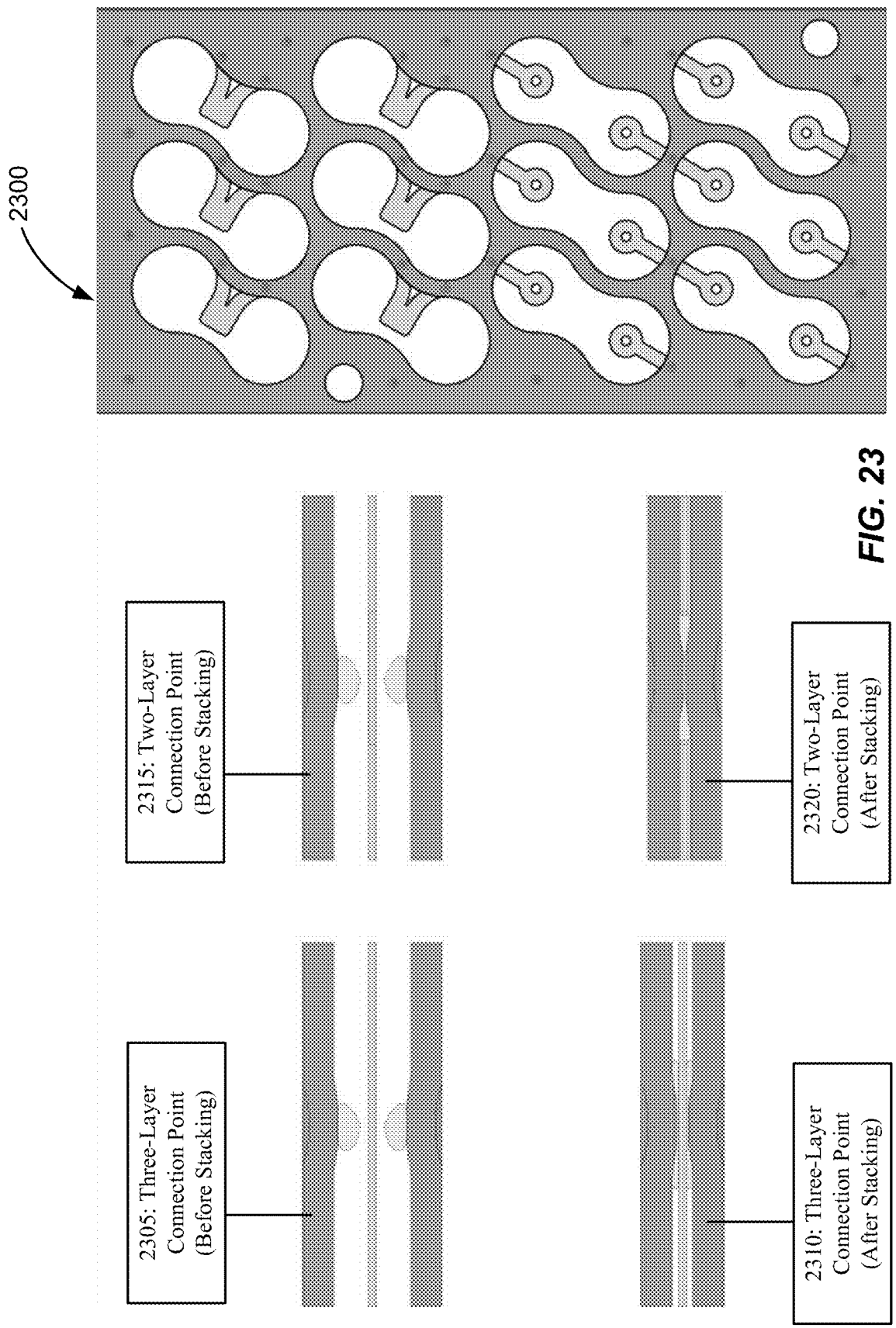
FIG. 23 illustrates examples of a three-layer connection point and a two-layer connection point before and after stacking of the plate sections and intermediate sheet of FIG. 22 in accordance with an embodiment of the disclosure.
Figure 24:
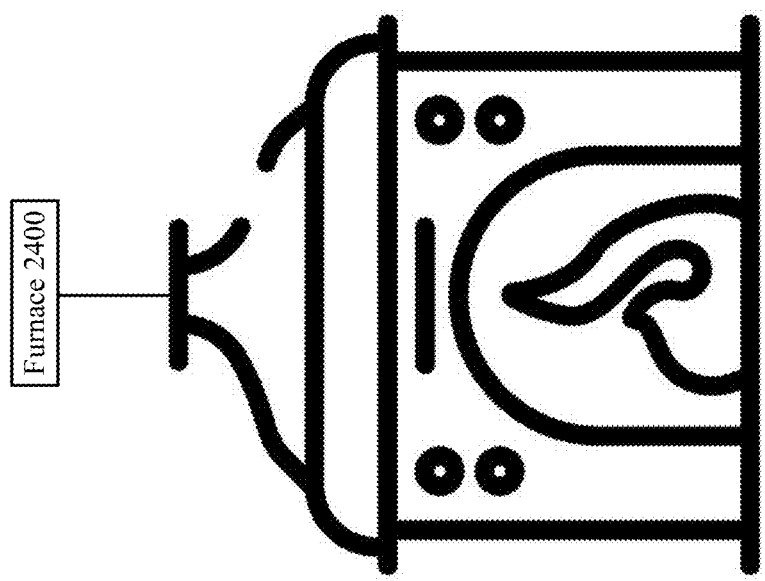
FIG. 24 illustrates an example of the stacked structure of FIG. 23 being passed through a furnace in accordance with an embodiment of the disclosure.
Figure 24:
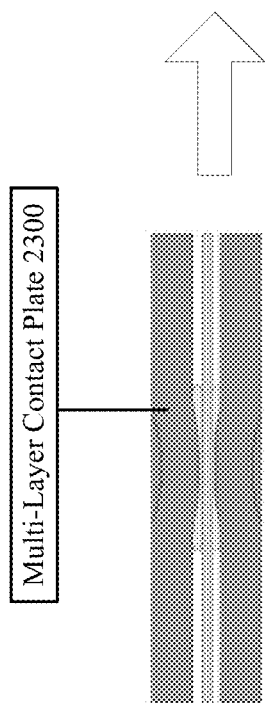

FIG. 23 illustrates a multi-layer contact plate 2300 in accordance with an embodiment of the disclosure. In an example, the multi-layer contact plate 2300 may be produced by stacking the braze-ready or solder-ready plates sections 2200 and 2205 with the intermediate sheet 2010 and then passing the resultant stacked structure through a furnace 2400, as shown in FIG. 24.

Referring to FIG. 23, the multi-layer contact plate 2300 may include a number of inter-layer connection points that are generally aligned with the dimples in its constituent plate sections. In an example, the inter-layer connection points may be implemented as "three-layer" connection points whereby sections from both plate sections and the intermediate sheet or joined, or as "two-layer" connection points whereby the plate sections are joined together directly by virtue of being aligned with a hole in the intermediate sheet. Generally, two-layer connection points may provide higher mechanical strength relative to three-layer connection points in the multi-layer contact plate, while three-layer connection points facilitate higher electrical conductivity in the multi-layer contact plate. Hence, in an example, a combination of two-layer and three-layer connection points may be used to provide both higher mechanical strength and higher electrical conductivity.

In an example, additional soldering or brazing material may be applied at two-layer connection points (e.g., to account for the missing intermediate sheet thickness), while less soldering or brazing material may be applied between the plate sections and the intermediate sheet at three-layer connection points.

At 2305, a three-layer connection point is shown before stacking of the plate sections with the intermediate sheet. At 2310, the three-layer connection point is shown after stacking of the plate sections with the intermediate sheet. At 2315, a two-layer connection point is shown before stacking of the plate sections with the intermediate sheet. At 2320, the two-layer connection point is shown after stacking of the plate sections with the intermediate sheet.

While FIG. 23 depicts the soldering or brazing material being applied on top of the raised dimples on the plate sections, in other embodiments the soldering or brazing material may be applied (at the dimples) to the intermediate sheet only, to a combination of the plate sections and the intermediate sheet, or to only one particular plate section (e.g., for two-layer connection points). In a further example, the stacking of the plate sections with the intermediate sheet may occur while the soldering or brazing material is in a liquid state (e.g., wet and ductile) via a clamping rack (e.g., for stacking the respective layers by pressing the plate sections and intermediate sheet tightly together before being passed through the furnace 2400). In an alternative example, the layers may be stacked after the soldering or brazing has tried (although, prior to being passed through the furnace 2400).

Figure 25:
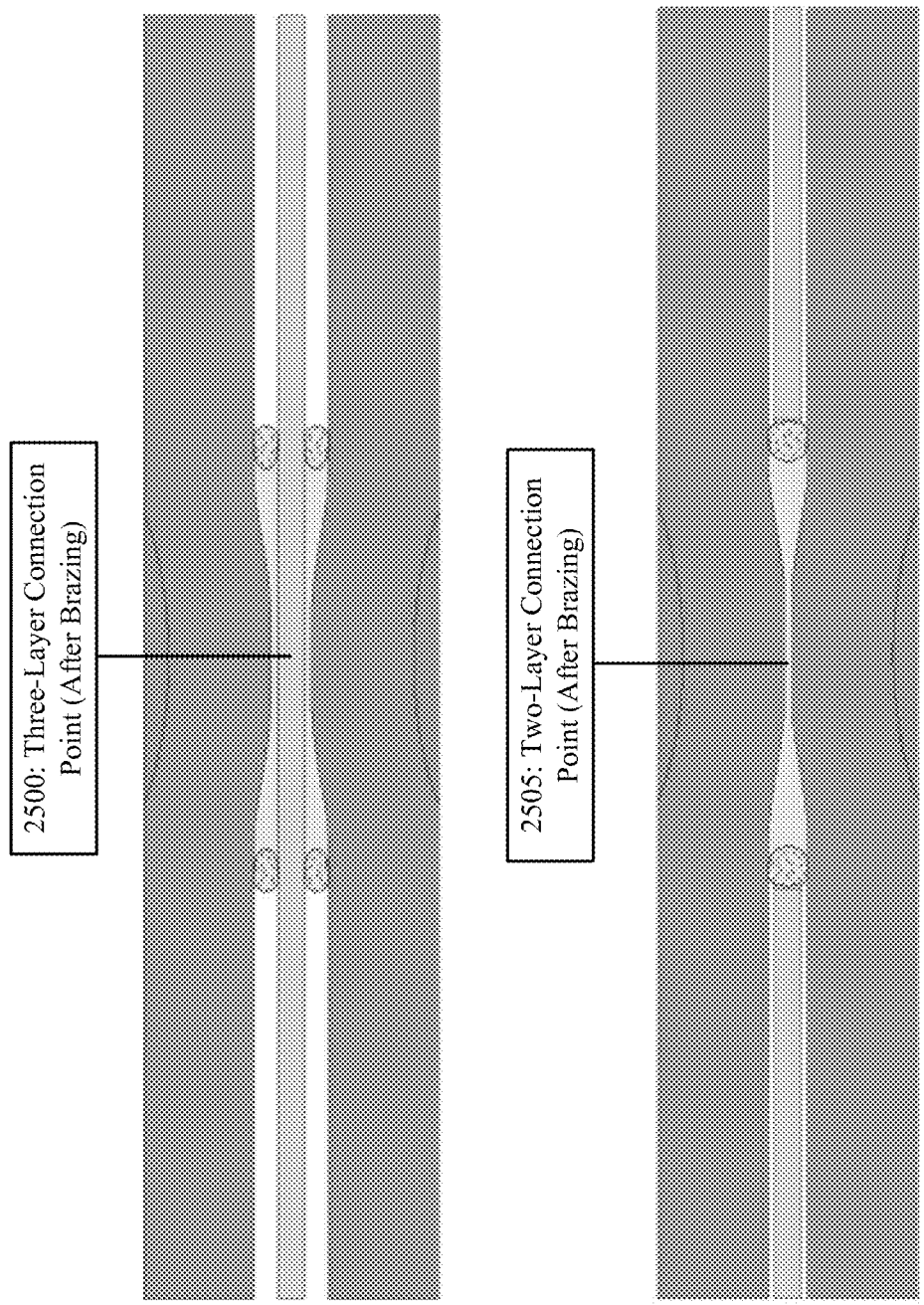
FIG. 25 illustrates examples of connection points of a multi-layer contact plate formed as a result the stacked structure being passed through the furnace as shown in FIG. 24 in accordance with an embodiment of the disclosure.

After the stacking of the plate sections with the intermediate sheet, the stacked structure is passed through the furnace 2400, which melts the soldering or brazing material to form the respective inter-layer connection points to facilitate strong mechanical strength and/or high electrical conductivity in the multi-layer contact plate 2300. FIG. 25 illustrates a three-layer connection point 2500 and a two-layer connection point 2505 after being passed through the furnace 2400 in accordance with an embodiment of the disclosure.

Figure 26:
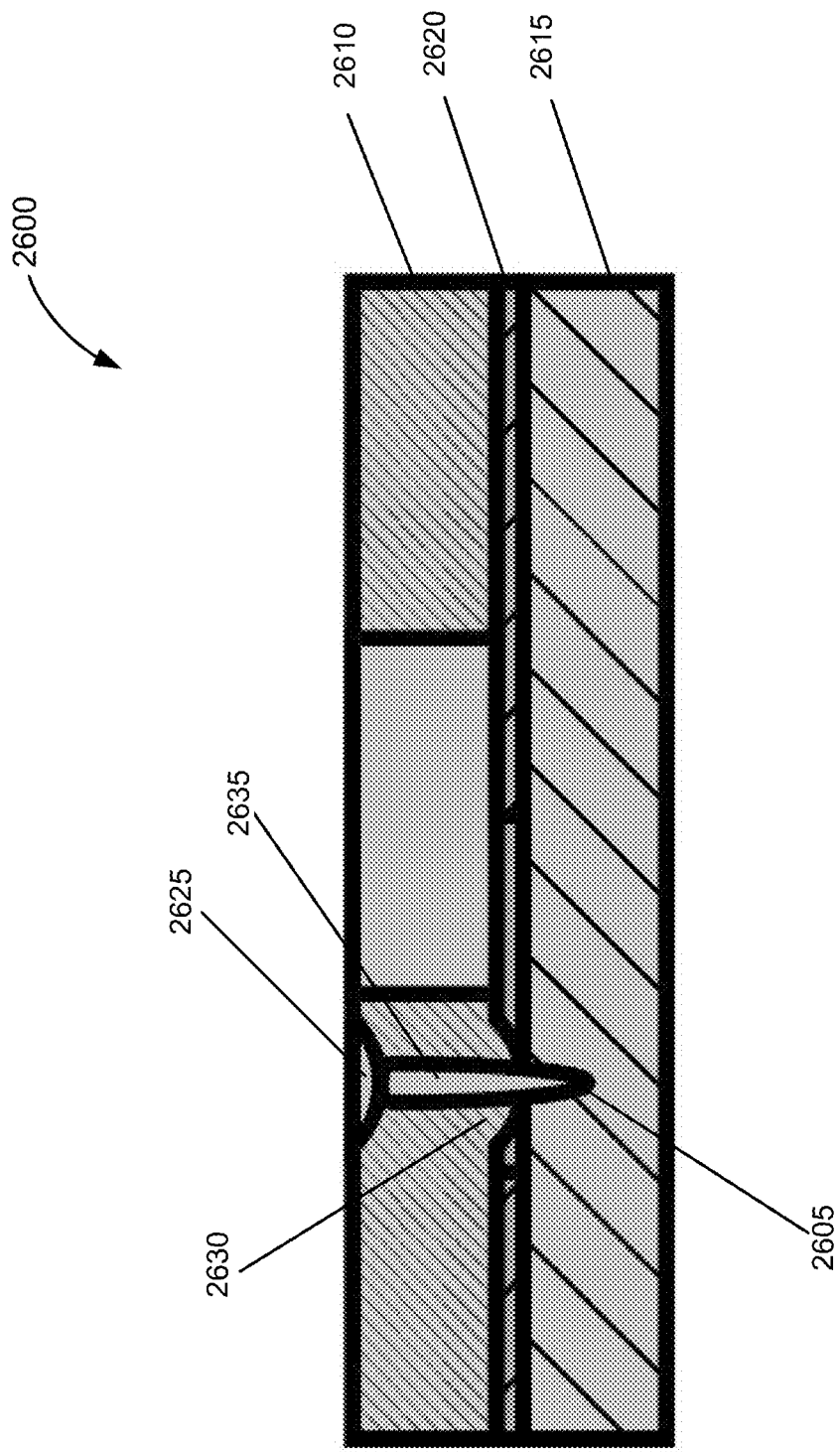
FIG. 26 illustrates part of a multi-layer contact plate where a two-layer connection point joins a top plate section with a bottom plate section in a hole defined in an intermediate sheet in accordance with an embodiment of the disclosure.

While FIGS. 21-25 illustrate embodiments whereby dimples are defined in both top and bottom plate sections before joinder of the respective plate sections into a multi-layer contact plate (e.g., by passing through a furnace), in other embodiments only one of the plate sections may be arranged with dimples prior to joinder, as shown in FIG. 26.

FIG. 26 illustrates part of a multi-layer contact plate 2600 where a two-layer connection point 2605 joins a top plate section 2610 with a bottom plate section 2615 in a hole defined in an intermediate sheet 2620. In the embodiment of FIG. 26, a dimple is defined in the top plate section 2610 prior to joinder, with a recessed part 2625 of the dimple defined in an outer side of the top plate section 2610 and a raised part 2630 of the dimple defined in an inner side of the top plate section 2610. In the embodiment of FIG. 26, the two-layer connection point 2605 further comprises a tack 2635 (e.g., a laser tack) through the dimple to strengthen the mechanical connection between the top plate section 2610 and the bottom plate section 2615. While not shown expressly, a single-dimple three-layer connection point could also be implemented (with or without tacking) in a manner similar to FIG. 26 (e.g., implementing a pre-joinder dimple on only one of the top or bottom plate sections in an area where the intermediate sheet 2620 is not cut out).

While FIGS. 21-26 illustrate embodiments whereby dimples are mechanically pre-defined in both top and bottom plate sections before joinder of the respective plate sections into a multi-layer contact plate (e.g., by passing through a furnace), in other embodiments f the plate sections may be joined via tacking without such mechanically pre-defined dimples.

Figure 27:
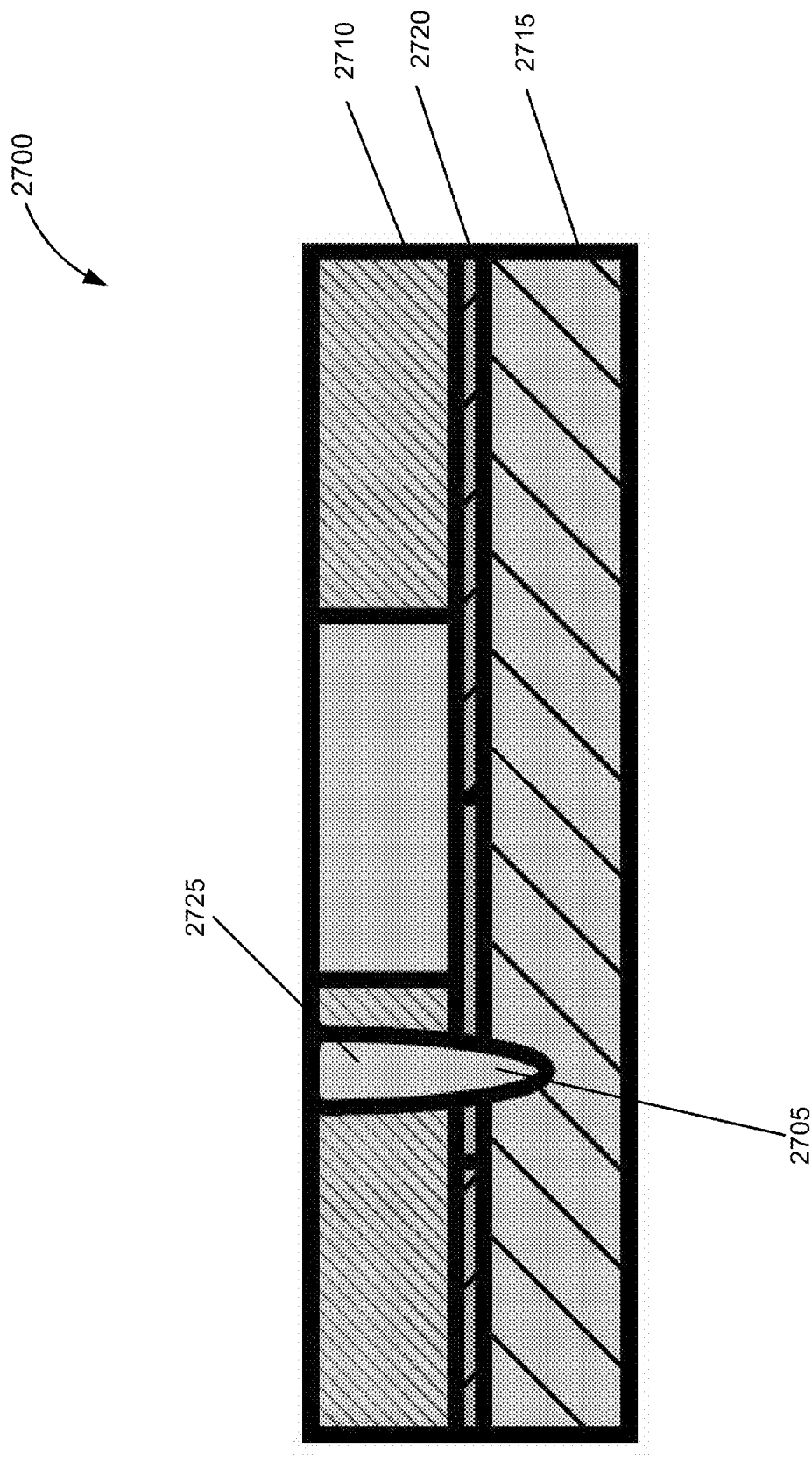
FIG. 27 illustrates part of a multi-layer contact plate where a two-layer connection point joins a top plate section with a bottom plate section in a hole defined in an intermediate sheet in accordance with another embodiment of the disclosure.

FIG. 27 illustrates part of a multi-layer contact plate 2700 where a two-layer connection point 2705 joins a top plate section 2710 with a bottom plate section 2715 in a hole defined in an intermediate sheet 2620. In the embodiment of FIG. 27, the two-layer connection point 2705 comprises a tack 2725 (e.g., a laser tack) through a non-dimpled part of the top plate section 2710 to strengthen the mechanical connection between the top plate section 2710 and the bottom plate section 2715. While not shown expressly, a three-layer connection point could also be implemented (with or without tacking) in a manner similar to FIG. 27 (e.g., applying a tack between the top and bottom plate sections 2710-2715 in an area where the intermediate sheet 2720 is not cut out). In the embodiment of FIG. 27, it will be appreciated that the tack 2725 itself creates a dimple in the top plate section 2710. Hence, some embodiments relate to inter-layer connection points based on mechanically pre-defined dimples in respective plate section(s) pre-joinder (e.g., see FIGS. 21-26), while other embodiments relate to inter-layer connection points based on tacking in respective plate section(s) during joinder or post-joinder (e.g., see FIGS. 26-27).

Figure 28:
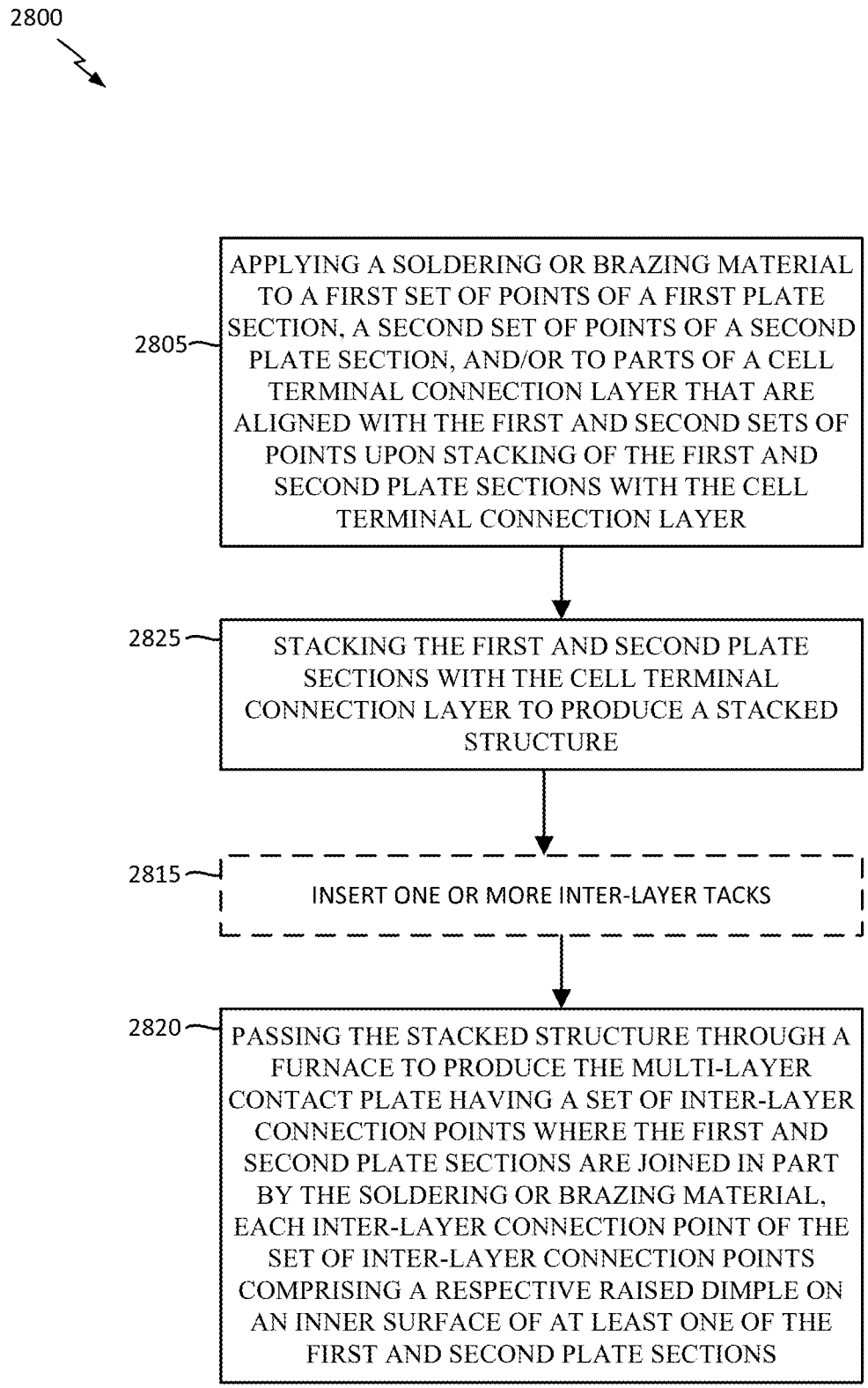
FIG. 28 illustrates a process of forming of a multi-layer contact plate in accordance with an embodiment of the disclosure.

FIG. 28 illustrates a process 2800 of forming of a multi-layer contact plate in accordance with an embodiment of the disclosure. The process 2800 of FIG. 28 may be implemented so as to form any of the multi-layer contact plates described above with respect to FIGS. 21-27.

At 2805 (e.g., as in FIG. 22), a soldering or brazing material is applied to a first set of points of a first plate section, a second set of points of a second plate section, and/or to parts of a cell terminal connection layer (e.g., intermediate sheet) that are aligned with the first and second sets of points upon stacking of the first and second plate sections with the cell terminal connection layer. In an example, the first set of points corresponds to a first set of raised dimples on the first plate section and the second set of points corresponds to a second set of raised dimples on the second plate section. In this case, the respective first and second sets of dimples are mechanically pre-defined in the respective plate sections prior to their joinder. In other designs, only one of the first and second plate sections includes the set of raised dimples on the inner side of the respective plate section. In other designs, the first set of points and/or the second set of points may correspond may correspond to flat or non-dimpled parts of the respective plate sections. In other designs, the first set of points may correspond to flat or non-dimpled parts of the first plate section while the second set of points corresponds to mechanically pre-defined dimples in the second plate section (or vice versa).

At 2810 (e.g., as in FIG. 23), the first and second plate sections with the cell terminal connection layer are stacked to produce a stacked structure. At 2815 (e.g., as shown in FIGS. 26-27), the first plate section to the second plate section are optionally tacked (e.g., either through a mechanically pre-defined dimple as in FIG. 26, or through flat sections of the plate sections as in FIG. 27).

At 2820 (e.g., as in FIG. 24), the stacked structure is passed through a furnace to produce the multi-layer contact plate having a set of inter-layer connection points (e.g., two-layer connection points, three-layer connection points, a combination thereof, etc.) where the first and second plate sections are joined in part by the soldering or brazing material, each inter-layer connection point of the set of inter-layer connection points comprising a respective raised dimple on an inner surface of at least one of the first and second plate sections.

Referring to FIG. 28, the set of inter-layer connection may include a first subset of two-layer connection points where soldering or brazing material is applied directly between the first and second plate sections in a region of the multi-layer contact plate corresponding to a hole in the cell terminal connection layer, and a second subset of three-layer connection points where the soldering or brazing material is applied between the first plate section and the cell terminal connection layer and also between the second plate section and the cell terminal connection layer. In other designs, the set of inter-layer connection may include only two-layer connection points or only three-layer connection points.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the invention.

What is claimed is:

1. A multi-layer contact plate configured to establish electrical bonds to battery cells in a battery module, comprising:
   a first plate section;
   a second plate section, at least one of the first and second plate sections being configured with a set of raised dimples on an inner side of the respective plate section;
   a cell terminal connection layer sandwiched between the first and second plate sections, wherein a portion of the cell terminal connection layer is configured to form a set of bonding connectors to provide a direct electrical bond between the multi-layer contact plate and terminals of at least one group of battery cells; and
   a set of inter-layer connection points arranged between at least the first and second plate sections, each inter-layer connection point of the set of inter-layer connection points comprising a respective raised dimple from the set of raised dimples,
   wherein the set of raised dimples is formed as a result of tacking during joinder of the first and second plate sections in the multi-layer contact plate, or
   wherein the set of inter-layer connection points includes:
      a first subset of two-layer connection points where soldering or brazing material is applied directly between the first and second plate sections in a region of the multi-layer contact plate corresponding to a hole in the cell terminal connection layer, and a second subset of three-layer connection points where the soldering or brazing material is applied between the first plate section and the cell terminal connection layer and also between the second plate section and the cell terminal connection layer.

2. The multi-layer contact plate of claim 1, wherein both the first and second plate sections include a respective set of raised dimples on respective inner sides.

3. The multi-layer contact plate of claim 1, wherein only one of the first and second plate sections includes the set of raised dimples on the inner side of the respective plate section.

4. The multi-layer contact plate of claim 1, wherein the set of raised dimples is pre-formed in the respective plate section before the first and second plate sections are joined together in the multi-layer contact plate.

5. The multi-layer contact plate of claim 1, wherein the set of raised dimples is formed as a result of the tacking.

6. The multi-layer contact plate of claim 1, wherein the set of inter-layer connection points includes:
   the first subset of two-layer connection points, and
   the second subset of three-layer connection points.

7. A method of forming a multi-layer contact plate comprising a first set of points of a first plate section, a second set of points of a second plate section, and parts of a cell terminal connection layer that are aligned with the first and second sets of points upon stacking of the first and second plate sections with the cell terminal connection layer, comprising:
   applying a soldering or brazing material to (i) the first set of points of the first plate section, (ii) the second set of points of the second plate section, (iii) the parts of the cell terminal connection layer, or (iv) a combination thereof;
   stacking the first and second plate sections with the cell terminal connection layer to produce a stacked structure; and
   passing the stacked structure through a furnace to produce the multi-layer contact plate having a set of inter-layer connection points where the first and second plate sections are joined in part by the soldering or brazing material, each inter-layer connection point of the set of inter-layer connection points comprising a respective raised dimple on an inner surface of at least one of the first and second plate sections.

8. The method of claim 7, wherein the first set of points corresponds to a first set of raised dimples on the first plate section and the second set of points corresponds to a second set of raised dimples on the second plate section.

9. The method of claim 7, wherein only one of the first and second plate sections includes the set of raised dimples on the inner side of the respective plate section.

10. The method of claim 7, wherein the set of raised dimples is pre-formed in the respective plate section before the first and second plate sections are joined together in the multi-layer contact plate.

11. The method of claim 7, further comprising:
   tacking, after the stacking, the first plate section to the second plate section,
   wherein the set of raised dimples is formed as a result of the tacking.

12. The method of claim 7, wherein the set of inter-layer connection points includes:
   a first subset of two-layer connection points where soldering or brazing material is applied directly between the first and second plate sections in a region of the multi-layer contact plate corresponding to a hole in the cell terminal connection layer, and
   a second subset of three-layer connection points where the soldering or brazing material is applied between the first plate section and the cell terminal connection layer and also between the second plate section and the cell terminal connection layer.

* * * * *